United States Patent
Haskins et al.

(10) Patent No.: US 6,240,169 B1
(45) Date of Patent: May 29, 2001

(54) COMMUNICATIONS PROTOCOL FOR LEAST COST CALL ROUTING SYSTEM

(75) Inventors: Gregory M. Haskins, Billerica; Demian Bigelow, Groton, both of MA (US)

(73) Assignee: MediaCom Telesystems, Inc., Burlington, MA (US)

( * ) Notice: Subject to any disclaimer, the term of this patent is extended or adjusted under 35 U.S.C. 154(b) by 0 days.

(21) Appl. No.: 09/306,524

(22) Filed: May 6, 1999

(51) Int. Cl.[7] .................................................. H04M 15/00
(52) U.S. Cl. ...................... 379/114; 379/115; 379/121; 379/130; 379/140
(58) Field of Search ..................... 379/111, 112, 379/114, 115, 121, 127, 130, 143, 144, 132, 140, 155, 187, 198, 199

(56) References Cited

U.S. PATENT DOCUMENTS

| | | | |
|---|---|---|---|
| 4,122,308 | * 10/1978 | Weinberger et al. | 379/131 |
| 4,585,094 | * 4/1986 | Rottenkolber | 188/24.22 |
| 4,751,728 | * 6/1988 | Treat | 379/113 |
| 5,161,109 | 11/1992 | Keating et al. | 364/464.02 |
| 5,212,789 | 5/1993 | Rago | 395/600 |
| 5,289,536 | * 2/1994 | Hokari | 379/221 |
| 5,400,395 | * 3/1995 | Berenato | 379/114 |
| 5,420,914 | * 5/1995 | Blumhardt | 379/114 |
| 5,425,084 | * 6/1995 | Brinskele | 379/112 |
| 5,425,085 | 6/1995 | Weinberger et al. | 379/112 |
| 5,473,630 | 12/1995 | Penzias et al. | 375/114 |
| 5,515,425 | 5/1996 | Penzias et al. | 379/114 |
| 5,519,769 | 5/1996 | Weinberger et al. | 379/112 |
| 5,553,124 | * 9/1996 | Brinskele | 379/112 |
| 5,638,433 | * 6/1997 | Bubien, Jr. et al. | 379/130 |
| 5,764,741 | 6/1998 | Barak | 379/114 |
| 5,799,071 | 8/1998 | Azar et al. | 379/113 |
| 5,799,072 | 8/1998 | Vulcan et al. | 379/114 |
| 5,862,203 | 1/1999 | Wulkan et al. | 379/114 |
| 5,878,122 | * 3/1999 | White et al. | 379/115 |
| 5,881,139 | 3/1999 | Romines | 379/130 |
| 6,023,501 | * 2/2000 | Wakamatsu | 379/114 |

FOREIGN PATENT DOCUMENTS 0 586 157 A2   3/1994   (EP) .............................. G06F/15/403

OTHER PUBLICATIONS

Communiqué Telecommunications, Inc. (Ontario, California), "Customized Telemiser Selects Low–Cost Routing," *Computerworld*, vol. XVIII, No. 48, Nov. 28, 1983, p. 109 (plus cover page and contents page).

Communiqué Telecommunications, Inc. (Ontario, California), "Least–Cost Router," *Telecommunications*, vol. 18, No. 1, Jan., 1984, p. 92 (plus cover page and contents page).

Communiqué Telecommunications, Inc. (Ontario, California), "How to Make the Least of Your Long Distance Phone Bill," *Communications News*, vol. 21, No. 9, Sep. 1984, p. 171 (plus cover page).

Communiqué Telecommunications, Inc. (Ontario, California), "How to Make the Least of Your Long Distance Phone Bill," *Sports Illustrated*, Oct. 1, 1984, p. 113 (plus cover page).

* cited by examiner

*Primary Examiner*—Curtis Kuntz
*Assistant Examiner*—Binh K. Tieu

(57) ABSTRACT

A least cost call routing system operates in conjunction with one or more telephones disposed in a location to provide least cost telephone call routing using a selected one of a number of commercial telephone carriers. The least cost call routing system can automatically contact a central server, on a periodic basis, to receive updated rate provider information. In addition, the least cost call routing system uses a unique communications protocol that utilizes data compression techniques to minimize the bandwidth needed for the update.

8 Claims, 16 Drawing Sheets

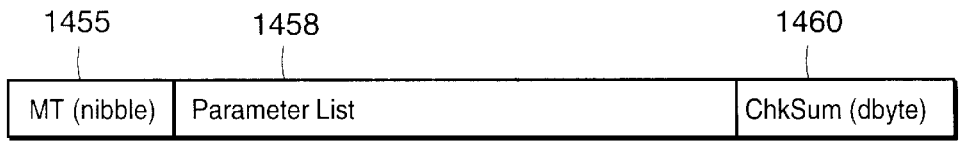

FIG. 8A

| Name | Value | Direction | Description |
|---|---|---|---|
| ZeroMemory | 0x0 | s-c | Writes zeros to the specified memory location |
| Write | 0x1 | s-c | Write to the specified memory location |
| Read | 0x2 | s-c | Read from the specified memory location |
| Move | 0x3 | s-c | Move from one region to another |
| Done | 0x4 | s-c | Update complete. Set device active/restart |
| Data | 0x5 | bidir | Data transmission |
| GetChkSum | 0x6 | s-c | Force client to compute checksum on memory |
| Response | 0x7 | s-c | Response from remote method |
| SET | 0x8 | s-c | Specify value to set in specific memory location |
| NOP | 0x9 | na | No operation |
| NOP | 0xa | na | No operation |
| NOP | 0xb | na | No operation |
| NOP | 0xc | na | No operation |
| NOP | 0xd | na | No operation |
| NOP | 0xe | na | No operation |
| NOP | 0xf | na | No operation |

Data
Prototype:     (dbyte) dbErrorCode = Data(length lDataLength, byte bData[]);
Description:   sends a block of data from one end to the other
Return:        error code from the errorcode table.
CallerPostOp:  NONE.
CalleePostOp:  NONE.
Layout Diagram:

FIG. 8C

ZeroMemory

Prototype: (dbyte) dbErrorCode = ZeroMemory(address aStart, length aLength);
Description: specifies a write operation of all zeros to device memory from aStart for a length a Length
Return: error code from the errorcode table.
CallerPostOp: NONE.
CalleePostOp: NONE.
Layout Diagram:

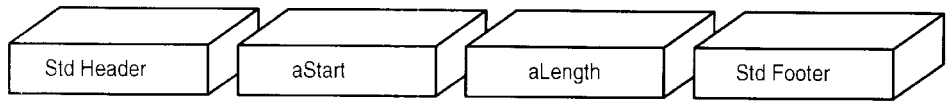

FIG. 8D

Write

Prototype: (dbyte) dbErrorCode = Write(address aStart, length aLength);
Description: specifies a write operation from server memory to device memory from aStart for length aLength
Return: error code from the errorcode table.
CallerPostOp: Transmit data block of length aLength using Data command.
CalleePostOp: NONE.
Layout Diagram:

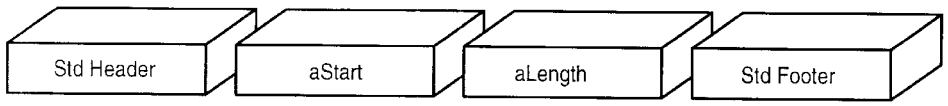

Notes: A return value that indicates success does not mean the data has been successfully written. The caller must wait for the response from the postop phase to determine this. The reason why the actual data transmission is sent in a separate step is so the checksum can ve verified from the parameter list before the data is accepted. Otherwise the whole data stream would need to be read before the message could be verified. This causes a problem because we are going to write to memory in real time. Therefore, if there were an error in the transmission, it would not be detected until after all of the memory was corrupted.

FIG. 8E

Read

Prototype: (dbyte) dbErrorCode = Read(address aStart, length aLength);
Description: specifies a read operation from device memory from aStart for a length aLength
Return: error code from the errorcode table.
CallerPostOp: NONE.
CalleePostOp: Transmit data block of length aLength using Data command.
Layout Diagram:

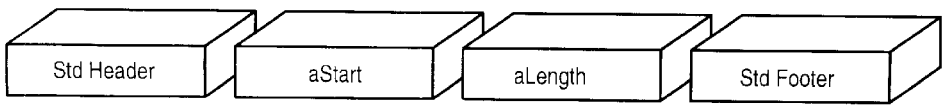

Notes: A return value that indicates success means that the caller should expect a Data block for the next transmission immediately following the return command from the callee.

FIG. 8F

*Move*

Prototype: (dbyte) dbErrorCode =
　　　　　　　Move(address aSourceStart, length aLength, address aDestStart).
Description: specifies a move operation from device memory to device memory.
Return: error code from the errorcode table.
CallerPostOp: NONE.
CalleePostOp: NONE.
Layout Diagram:

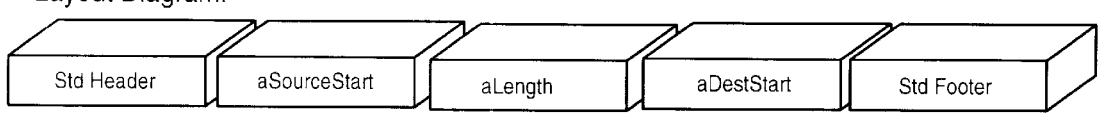

Notes: The move command is provided for updating extremely sensitive regions of memory (such as the "Server Phonenumber" field in the global table. This way using some unused portion of NVRAM, it is possible by do a change to the global table by writing to an arbitrary buffer, verifying its contents, and then moving it to the proper location.

FIG. 8G

*Done*

Prototype: (dbyte) dbErrorCode = Done(dbyteDoneCode).
Description: tells the client that the update is complete. IF the DoneCode - 0, the update failed. If the DoneCode = 1 the update succeeded. If the DoneCode = 2 then the device should restart the update process.
Return: error code from the errorcode table
CallerPostOp: Terminate the connection.
CalleePostOp: NONE.
Layout Diagram:

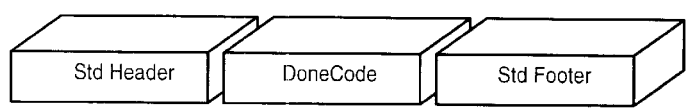

FIG. 8H

*GetChkSum*

Prototype: (dbyte) dbChkSum = Data(address aSart, lenth aLength);
Description: forces the device to compute a checksum on its memory from aSart for length aLength
Return: CheckSum from the specified region in memory
CalleePostOp: NONE.
CallerPostOp: NONE.
Layout Diagram:

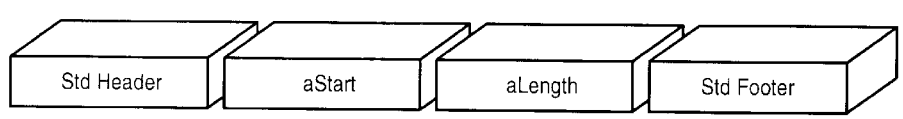

FIG. 8I

*Response*

Prototype: void Response (dbyte dbRetVal);
Description: Sends a response from one end of the connection to another
Return: NONE.
CalleePostOp: NONE.
CallerPostOp: NONE.
Layout Diagram:

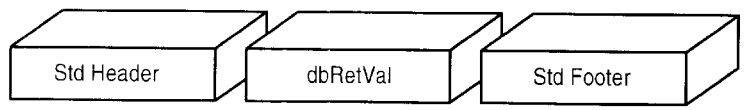

FIG. 8J

*Set*

Prototype: dbyte dbErrocode = Set (address aStart, lenth aLength, byte data);
Description: Specifies a write upread of all data to device memory, starting from aStart for a lenght aLength.
Return: error code from the error code table
CalleePostOp: NONE.
CallerPostOp: NONE.
Layout Diagram:

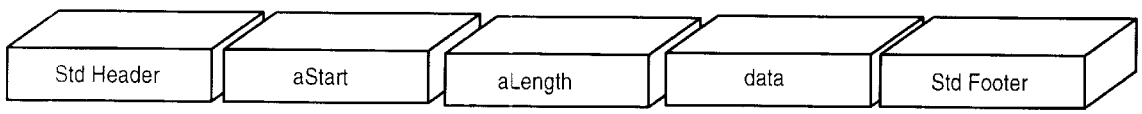

FIG. 8K

COMMUNICATIONS PROTOCOL FOR LEAST COST CALL ROUTING SYSTEM

FIELD OF THE INVENTION

The invention relates generally to the field of least cost telephone call routing. In particular, the invention relates to methods for communicating with and controlling a device used to route telephone calls along a least cost route.

BACKGROUND OF THE INVENTION

The growth and deregulation of the telephone industry over the past several years has given birth to hundreds of commercial long distance carriers. Presently, more than 450 long distance carriers operate in the United States, with an average of more than 30 of such carriers serving each state. The resulting competition has caused long distance carriers to offer specific rate plans to gain market share. These rate plans include special pricing for various calling patterns during specific time periods. Long distance subscribers (i.e., consumers and businesses) have been overwhelmed these often confusing rate plans, each promising big discounts and cost savings. Typically, most subscribers use a single major carrier (e.g., AT&T, MCI, Sprint) for long distance telephone service. For example, more than 90% of consumers presently use one of the three major long distance carriers. Few subscribers know that hundreds of smaller long distance carriers exist. Moreover, few subscribers know how to get access to the superior rates offered by these carriers, or that they can select each carrier on a call-by-call basis.

Various systems aimed at providing subscribers with access to multiple carriers on a call-by-call basis, i.e., least cost call routing systems, have been described in the art. For example, U.S. Pat. Nos. 4,122,308, 4,585,094, 4,751,728, 5,289,536, 5,400,395, 5,420,914, 5,425,084, 5,425,085, 5,473,630, 5,519,769, 5,553,124, and 5,799,072 describe least cost call routing devices and methods. To date, however, the technology described in these patents has not resulted in a least cost call routing system of widespread commercial acceptance with household and small office/home office consumers.

SUMMARY OF THE INVENTION

One disadvantage of many prior art systems is that the protocol that these systems use to communicate is often quite complicated and requires that the least call routing system have the resources (e.g., memory, network interfaces, error correction circuits, modems, and the like) to support the protocol. Moreover, some of these prior art systems require user input to perform the update. The complicated communications interfaces of such prior art devices make it difficult to update the least cost routing information stored on the least cost routing system. If the least cost routing system is not updated properly, the routing of the telephone call to a particular carrier might not reflect the optimum (i.e., least cost) route for the call.

It is therefore an object of the present invention to provide a least cost call routing system having a communications protocol that does not require a complicated hardware interface and can perform updates to least cost routing information without user input.

Another disadvantage of many prior art systems is that the updating of the least cost routing device itself often requires significant transmission bandwidth and takes a relatively long time to accomplish the update. Because providers of least cost routing systems often pay for update calls made to their servers, lengthy update times are not cost-effective for the providers of least cost routing systems. Accordingly, it is another object of the present invention to provide a least cost routing system having a communications protocol that utilizes data compression techniques to minimize the bandwidth needed for updates.

In one aspect, the present invention comprises a method for controlling the updating of a customized database stored in a device capable of routing telephone calls along a least cost route, the device comprising a memory, a dialer and a controller. This method comprises the steps of determining upon power up whether the database requires updating; preventing the device from routing calls along a least cost route if the database requires updating; connecting the device to a server over the telephone line using the dialer, within a first predetermined period, to initiate an update to the customized database, if the database requires updating; receiving a response from the server if the connection described above was successful; storing in the memory a customized database provided by the server, the database comprising least cost routing information for use in routing telephone calls along a least cost route; disconnecting the device from the server and enabling the device to route calls along a least cost route if the updating described above was successful; disconnecting the device from the server and connecting the device to the server over the telephone line using the dialer within a second predetermined second time period to initiate an update to the customized database, if the update of step described above was not successful; determining on a periodic basis whether the database requires updating, and repeating the foregoing steps if the database requires further updating.

In another aspect, the present invention comprises a method for providing an update from a server to a customized database stored in a device capable of routing telephone calls along a least cost route, the device comprising user information, a first memory, a dialer, and a controller. This method comprises the steps of receiving at the server via a telephone line, an incoming telephone call from the device; communicating with the device via the telephone line, to determine the user information; generating a customized set of commands at the server based on the user information; transmitting each command within the set of commands from the server to the device over the telephone line; processing each command at the device and transmitting a response to the server via the telephone line; and transmitting from the server to the device a command activating the device for least cost routing, if a response was received at the server for every command sent from the server to the client.

In yet another aspect, the present invention comprises a method for compressing the number of blocks of data written during an update from a server to a remote device capable of routing telephone calls along a least cost route, the remote device comprising a first memory, a dialer, and a controller. This method comprises the steps of receiving at the server an update request from the remote device; providing a first data stream at the server comprising a memory map of data currently stored in the memory of the remote device; providing a second data stream at the server comprising data that is to be written to the memory of the device, the second data stream being of the same length as the first data stream; separating the second data stream into a plurality of blocks and assigning to a first cluster all blocks having data that does not match the data at a corresponding location in the first data stream; discarding, from the blocks remaining in the second data stream, the first and last blocks and all blocks larger than a predetermined size; assigning the blocks remaining in the second data stream to the first cluster; combining the blocks of the first cluster that are adjacent to one another into an adjacent block, wherein the adjacent block comprises a plurality of blocks, that each are adjacent to at least one other block in the adjacent block; assigning all adjacent blocks and any blocks remaining in the first cluster to a second cluster; and writing the second cluster from the server to the remote device in response to the update request.

In still another aspect, the present invention provides a method for compressing the number of bytes of data that written during an update from a server to a remote device capable of routing telephone calls along a least cost route, the remote device comprising a first memory, a dialer, and a controller. This method comprises the steps of receiving at the server an update request from the remote device providing a data stream at the server comprising data that is to be written to the memory of the device, the data stream comprising a plurality of data bytes, each byte associated with a memory address; determining whether two or more of the data bytes are identical and adjacent; defining at least one block comprising a set of adjacent data bytes that are identical to each other; determining the starting and ending memory addresses for the block; counting the number of data bytes in the block and identifying this number as a block count; and defining a unique pattern command instructing the server to write the data byte at the start address a number of times equivalent to the block count, beginning at the start address on the device.

The steps of determining the adjacent bytes, defining a block of adjacent bytes, counting the data bytes in the block, and defining a pattern command for the block, are repeated until all data bytes in the data stream have been checked to determine if they are adjacent to identical data bytes. The method further includes the steps of generating at the server, for all data bytes in the data stream that are not assigned to a block, a customized set of commands relating to the update of the device; combining the customized set of commands with all pattern commands generated above into an update command set; and using the update command set to respond to the update request from the remote device.

The foregoing and other objects, aspects, features, and advantages of the invention will become more apparent from the following description and from the claims.

BRIEF DESCRIPTION OF THE DRAWINGS

This invention is described with particularity in the appended claims. The above and further advantages of this invention may be better understood by referring to the following description taken in conjunction with the accompanying drawings.

FIGS. 8A–8K are examples of a standard message format, set of commands, and command format, in accordance with an embodiment of the invention.

DETAILED DESCRIPTION OF THE INVENTION

Figure 1:
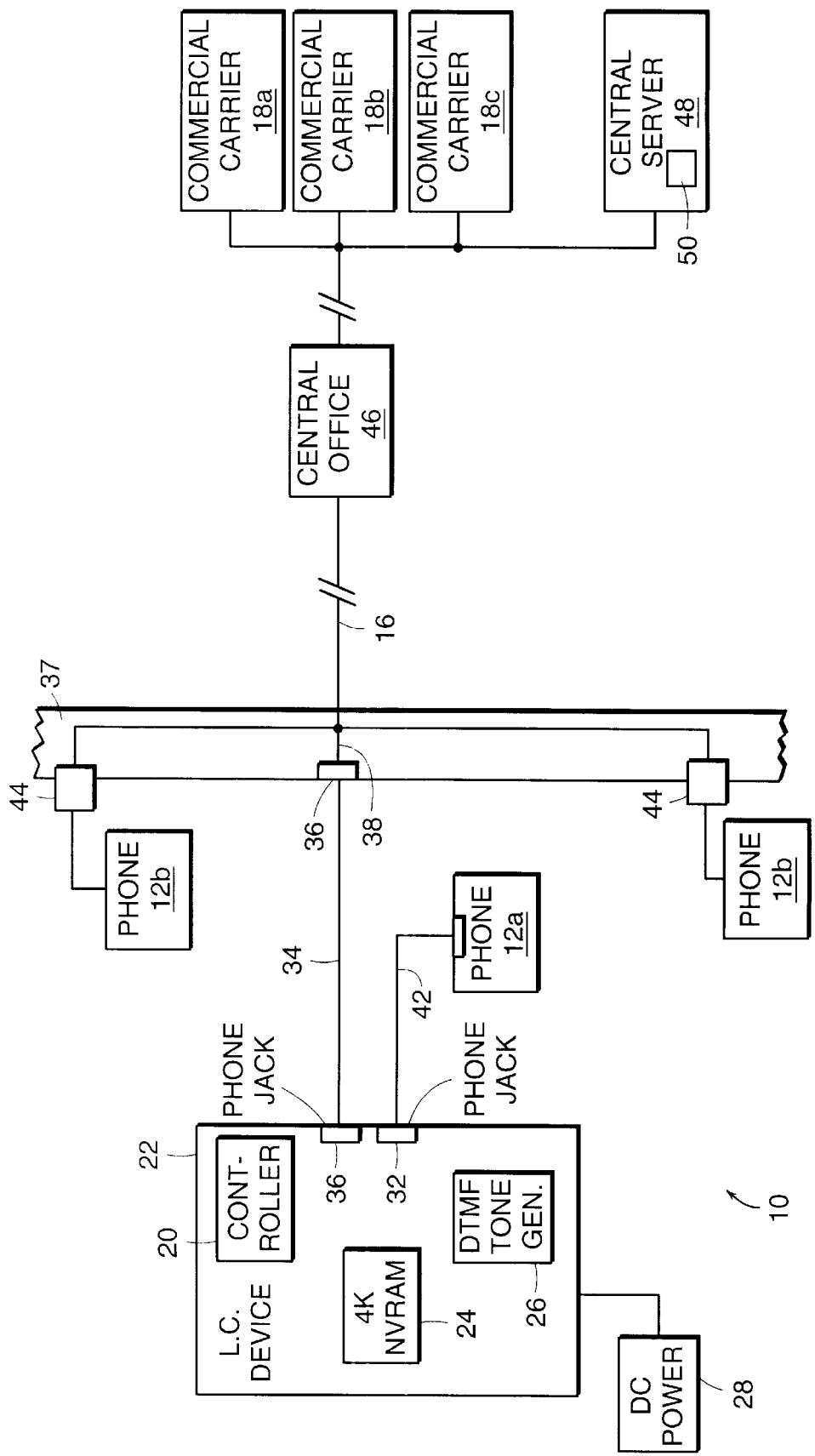
FIG. 1 is a block diagram of a least cost call routing system that operates in accordance with the principals of the present invention.

FIG. 1 illustrates a least cost call routing system incorporating the principles of the invention. The system 10 operates in conjunction with one or more standard telephones 12a, 12b and a source of direct current ("DC"), such as an adapter for a standard home outlet, to provide least cost telephone call routing over the public switched telephone network (PSTN) 16 using a selected one of a number of commercial telephone carriers 18a, 18b, 18c.

The system 10 includes a least cost routing device 22 that connects the telephones 12a, 12b, and the PSTN 16. The device 22 comprises, in one embodiment, a dialer device programmed with custom software stored on its controller 22. For example, the device can comprise a Zoom/Dialer brand dialer, manufactured by Zoom Telephonics, Boston, Mass.

The device 22 also comprises non-volatile memory 24 (NVRAM) for storing information, a dual-tone multifrequency ("DTMF") chip that handles DTMF tones, and a pair of telephone jacks 30, 32. In one embodiment, the memory 24 stores a database of least cost routing information that the controller 20 uses to determine the optimum route for a telephone call. As explained in greater detail below, the information in the table comes from the server 48 and is regularly updated, to ensure that call routing decisions are based on timely, accurate rate information.

The first jack 30 electrically connects the device 22, via a two-line (each line being a pair of wires) telephone cable 34 and the wall jack 36, to the telephone line 38 within a wall 37 of the location (e.g., a home or building). The PSTN is electrically connected to the telephone line 38. The second jack 32 electrically connects, via another telephone cable 42, to an optional telephone 12a that can be located adjacent the device 22.

The device 22 acts as a hub so that the incoming and outgoing calls to and from the telephones 12a, 12b are routed through the system 10. For the system to operate, the device 22 should be receiving power and be in an "active" state. Otherwise, the device 22 serves as a pass-through device that allows the telephones 12a, 12b to connect directly to the central office 46 (i.e., the local exchange carrier) via the PSTN 16.

Figure 2:
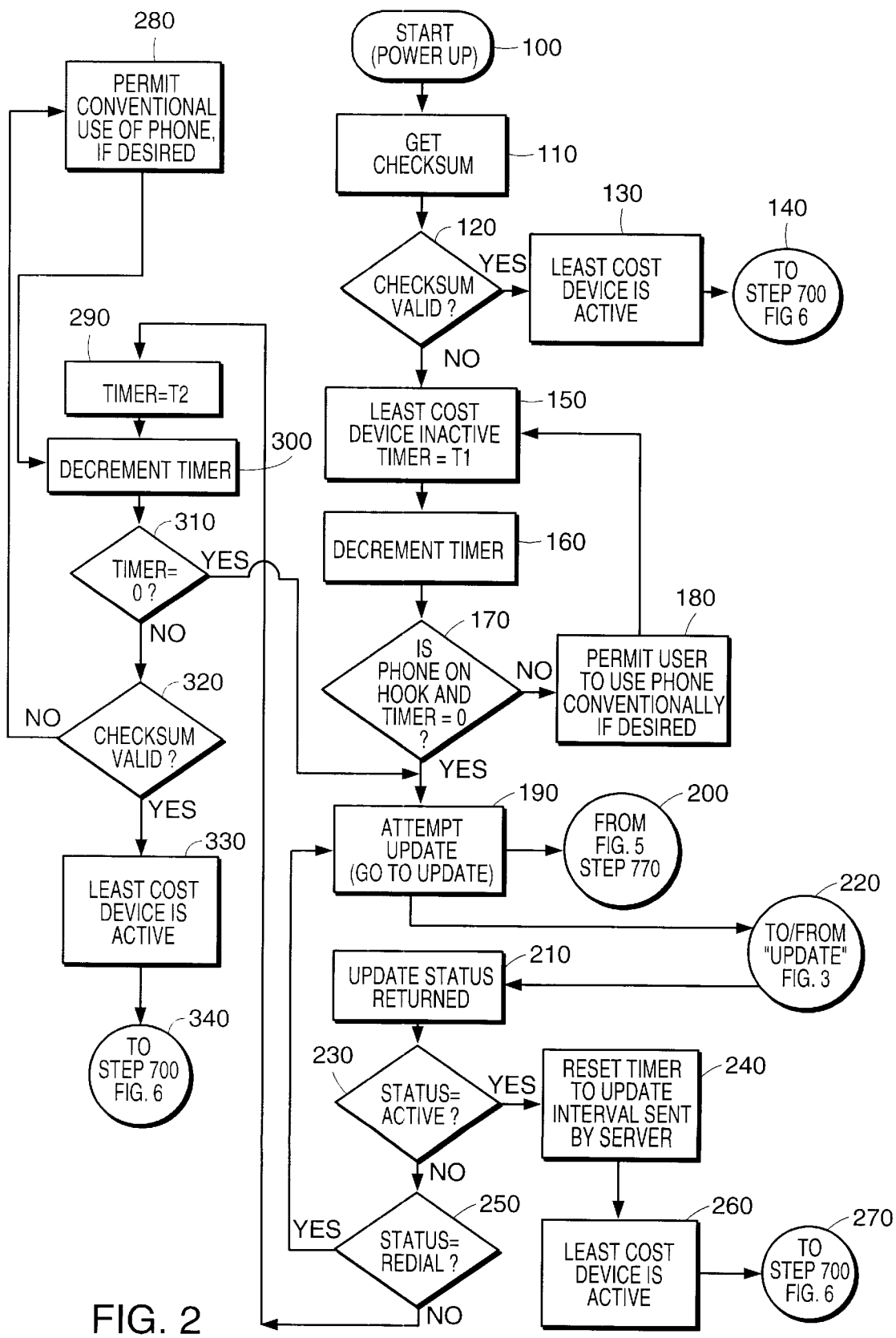
FIG. 2 is a flow chart representation of a method for controlling the updating of a least cost call routing system, in accordance with an embodiment of the invention.

FIG. 2 is a flow chart illustrating the operation of the system 10 when the power 28 is applied to the device 22, and illustrates a method for controlling the updating of the device 22. The steps illustrated in FIG. 2 are performed (as illustrated in more detail in FIG. 6) when the system is first powered up (step 100 of FIG. 2) or any other time that the power 28 to the device 22 has been interrupted.

After powering up (step 100), the device 22 initially is in an "active" state until the device makes a determination that its database needs updating. The device determines whether the database in memory 24 needs updating by computing a checksum (step 110) and checking the computed value against a "known" checksum value stored in the memory 24. The checksum stored in the memory 24 is computed after a successful update to the device and stored in an area of the memory 24 (called a "programmer's area") that is not written to by the server 48 or any element outside of the firmware running on the device 22. For example, in one embodiment of the invention, the first 256 bytes of the memory 24 are allocated as "programmer's area."

The checksum stored in the memory 24 is not changed until another successful update to the device 22 is performed. Thus, the checksum is stored when the database is known to be valid. In one embodiment of the invention, the device 22 may recompute the checksum based on its current database, and compare it to the stored checksum value. In another embodiment, the checksum is only computed upon a power-up, because that is the only time that the device 22 is not sure about the validity of its database.

For example, the server 28 may have told the device 22 that the update period is thirty days. The controller 20 can maintain a timer capable of tracking elapsed time. Thus, the device 22 can compute a checksum that is a function of the elapsed time. For example, the checksum may have a first value when the elapsed time is less than thirty days and may have a second value when the elapsed time is greater than or equal to thirty days. In this example, the device may use the checksum to determine whether it requires updating (step 120). The update period of thirty days is provided by way of example and should not be construed to be limiting. Other update periods may, of course, be used.

In addition, in other embodiments of the invention, other methods of determining whether the database needs updating may be used instead of the checksum method described above. For example, during a previous update the server 48 tells the device to update when a certain set of conditions is reached, such as after a predetermined number of power-ups in a predetermined period of time, or if an error condition occurs.

Figure 5:
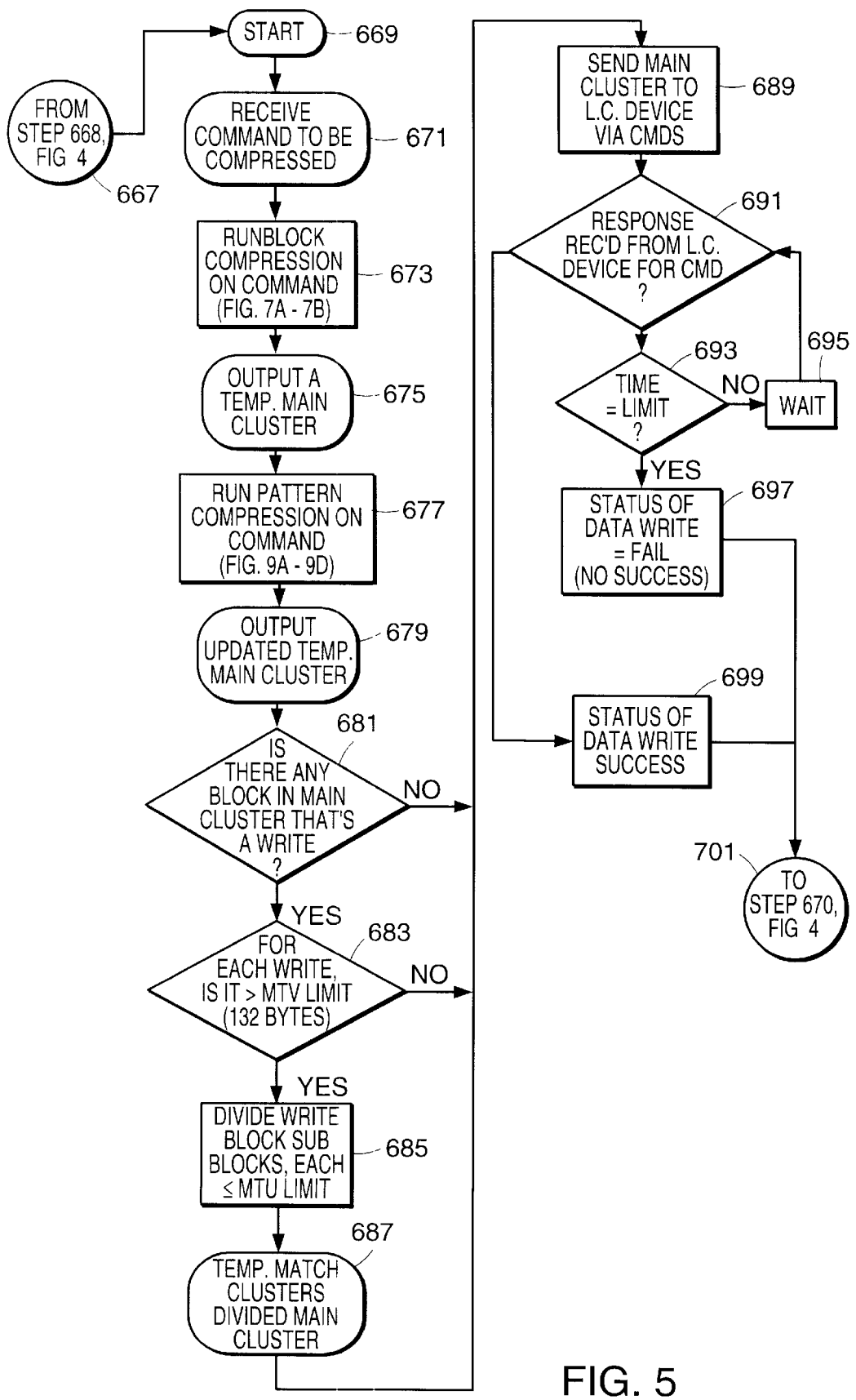
FIG. 5 is a flow chart representation of a method of compressing and sending data to a least cost routing device, in accordance with an embodiment of the invention.

If the checksum value indicates that the database does not require updating (step 120), then the device remains in the "active" state (step 130) and least cost routing of telephone calls occur in accordance with the steps outlined in FIG. 5 (step 140).

If, the checksum value indicates that the database stored in the memory 24 requires updating, the device goes into an "inactive" state (step 150) and the device 22 attempts to connect to the server 48 within a predetermined time (illustrated in FIG. 2 as t1) to obtain updated information from the server. In one embodiment, the predetermined time t1 is 30 seconds, but it should be understood that the predetermined time t1 can be any length of time. The controller 20 of the device 22 tracks the predetermined time t1 (step 160).

During the time between the device going into an "inactive" state (step 150) and connecting to the server (steps 190, 200 and FIG. 3), the user can, until the time t1 reaches its limit (step 170), pick up one of the phones 12a, 12b (i.e., the off-hook or originating state) and place a telephone call (step 180). Because the device 22 is inactive, calls made during this time are not routed along a least cost route. In the embodiment of the invention shown in FIG. 2, when the user completes a telephone call made during the t1 time interval, the t1 timer is reset when the phone call is completed (steps 180 and //In another embodiment (not shown), when a phone call occurs during the t1 interval, the timer countdown (step 160) is halted during the phone call and is restarted where it left off when the phone call is completed (step 180). In yet another embodiment (not shown), the timer continues to count down (step 160) during the phone call such that, if the t1 time was reached during the phone call, the device 22 attempts to connect to the server 28 without waiting. In the embodiment of the invention shown in FIG. 2, the device 22 does not attempt an update while a user is using the telephone.

Figure 3:
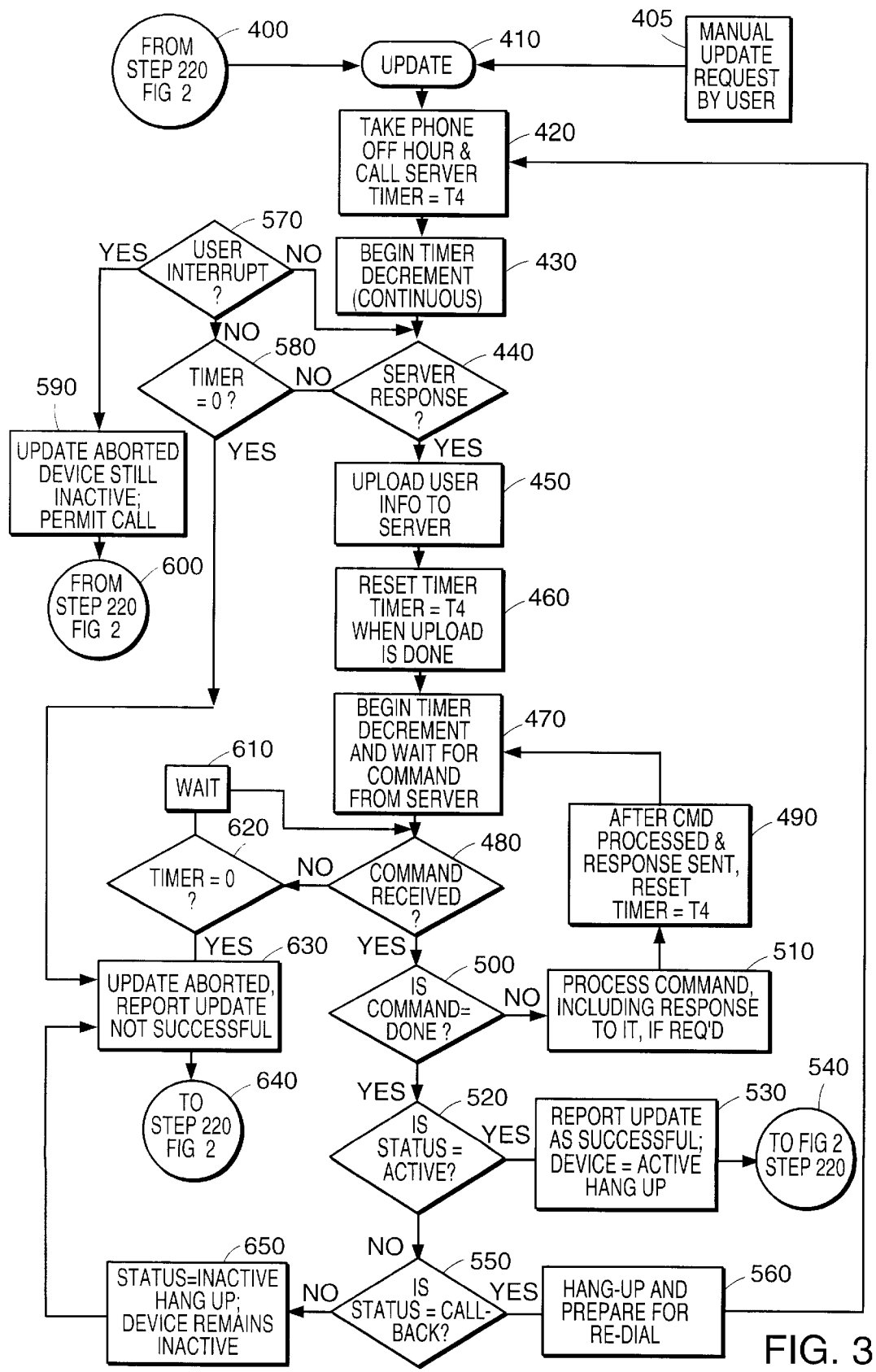
FIG. 3 is a flow chart representation of a method for updating a least cost call routing system, from the perspective of the least cost call routing device, in accordance with an embodiment of the invention.

Referring to FIGS. 1, 2, and 3, when the device 22 attempts to connect to the server 28 (steps 190, 200 of FIG. 2 and FIG. 3), the device 22 puts the phone in an off-hook state and places a call to the central server 48. FIG. 3, which is explained in greater detail below, describes how the device 22 and the server 48 communicate to accomplish an update. When the updating is complete the server 48 finishes the update by returning a "Done" message indicating the status of device 22 (step 210).

If the server 48 returns a status of "active" (indicating that the update was successful), the update period of the controller 20 is reset to the update period that was transmitted during the update by the server 48 (step 240). In another embodiment, if the server 48 returns a status of "active," then the update period remains unchanged unless the server 48 wants to change the value. If the update period is unchanged, then it is used to determine the time for the next update. This step informs the controller 20 of the time when next update must occur. When the device 22 is active (step 260), the device 22 operates in accordance with the method of FIG. 6 (discussed below).

If, following the update, the status of the device 22 is anything other than "active," then the update was not successful. For example, if the status of the device 22 is "re-dial," (step 250), this indicates that a problem occurred during update that the device 22 may be able to resolve by calling the server 48 back (step 190) or by calling a server at a different number (step 190). For example, the device 22 can attempt to connect using several different telephone numbers or using any one or more of several different servers (not shown in FIG. 1), each capable of providing an update. In this embodiment, when the device 22 receives a "re-dial" status, the device 22 automatically attempts connection to the server 48 using a different predetermined phone number. However, it should be noted that a device 22 that received a "re-dial" status when it attempted to update will still be in the "inactive" state it went to in step 150. In this embodiment, the only way that the status of the device 22 can be changed from "inactive" to "active" is by receiving a "Done" message with an "active" status, from the server 48. This message is sent only upon the conclusion of a successful update. However, in some embodiments of the invention, updating can be initiated by the device 22 (automatically) or the user can manually request on update.

If, following the update, the status of the device 22 is neither "active" nor "re-dial," then the status is interpreted as "inactive" (that is, the device 22 remains in an inactive state). The controller 20 then sets a timer t2 (steps 290 and 300) so that the device 22 can later (step 310) attempt to connect to the server 48 for updating (step 190). This attempt at re-connection with the server occurs continually until a successful update is achieved. In one embodiment of the invention, the timer t2 is set to 90 minutes. During the time that the timer is set (step 300), the user can use the telephones 12a, 12b connected to the device 22 in a normal fashion (step 280) but the calls are not routed along a least cost route.

In addition, during the time t2, the checksum is monitored (step 320) to determine if a non-automatic update has occurred during the time t2. For example, during the time t2 (but before the end of time t2), the user manually performs a successful update to the device 22 (see FIG. 3, step 405). Accordingly, the checksum indicates that the database of the device 22 does not need updating (step 320). The device is thus in an "active" state (step 330), and the device would then begin operating in accordance with FIG. 6.

FIG. 3 is a flowchart representation of a method for updating the least cost call routing device 22 (of FIG. 1) from the perspective of the device 22. The update is initiated either through a manual request by a user (step 405) or by a request from the update control method (FIG. 2, step 220). Referring to FIG. 1 and FIG. 3, when the device 22 determines that its database must be updated (step 400), it effectively "takes the phone off-hook" and calls the server 48 (step 420). When the device 22 calls into the server 48 (step 420), the device 22 waits a predetermined time for the server 48 to respond (steps 430, 440, 580). In one embodiment of the invention, the predetermined time is 30 seconds, but it should be understood that the predetermined time can be set to any desired length.

During the predetermined time (step 580), if a user manually attempts to make a call (step 570), the updating is halted (step 590) and the user is permitted to make the telephone call (although the call cannot be least cost routed). If the update is aborted (step 590), the update status is reported to the update control routing (step 600) as an unsuccessful update, and the device 22 will remain in an "inactive" state. Although not illustrated in FIG. 3, it should be understood that the user may make a call any time during later update steps (which will abort the update), not just during attempting to contact the server. Whenever this occurs and the update is not successfully completed, the result will be the same as steps 590 and 600.

If the server does not respond (step 440) within the predetermined time (step 580), the update is aborted (step 630) and is reported as unsuccessful to the update control routine (step 640). In one embodiment of the invention, if the attempt to contact the server 48 is unsuccessful, the status returned to the update control routine of FIG. 2 may be reported as "re-dial," indicating that the update was unsuccessful for the server 48 reached via a particular telephone number, but that an update should be attempted again using a server at a different telephone number.

Referring again to step 440 of FIG. 3, if the server 48 responds within the predetermined time, then contact between the server 48 and device 22 is established. The device 22 uploads user information to the server 48 (step 450). In one embodiment, the user information merely comprises the telephone number of the device 22 making the call to the server 48 (which typically is the user's telephone number). In another embodiment, where the server 48 being dialed is reachable using a toll-free telephone number, the server 48 automatically determines the telephone number of the device 22 making the telephone call by using a regular Caller ID function. Because Caller ID is not able to be blocked when dialing a toll free number (under present telecommunications regulations), the server 48 is able to ascertain the telephone number from which the device 22 is calling.

The server 48 can store subscriber information and a telephone number for each user that has registered with the central server 48 and is a current subscriber. Upon receipt of user identification information (step 450) or determination of the user's telephone number (not shown), the server 48 compares the received user identification information to the stored subscriber information.

After the device 22 makes contact with the server 48 and provides it with user identification information (step 45), the device 22 waits (step 610) a predetermined time t4 (step 470) for the server 48 to respond with an update command (step 480). If a command is not received before the time t4 reaches zero (step 620), then the update is aborted (step 630) and the status is returned to the update control routine (FIG. 2) as unsuccessful. If a command from the server 48 is received at the device 22 within the time t4, if the command is not a "Done" command, it is processed by the device (step 510). FIGS. 9A–9K, discussed below, illustrate examples of commands usable with the invention. When the device 22 is done processing the command, it transmits a response back to the server 48 (step 490) to tell the server 48 that the command was written successfully. As each command is received from the server 48 (step 480) it is processed by the device 22 in a similar manner, unless the command is a "Done" command.

If the server 48 sends the device 22 a "Done" command, and the status is "active" (step 520), the server 48 informs the device 22 that the update was successful. Accordingly, the device 22 reports the update as successful to the update control routine (steps 530, 540) of FIG. 2, the status of the device 22 becomes "active" (indicating that least cost routing is now possible), and the device 22 disconnects itself from the server. If the status of the "Done" command sent in step 480 is "call-back" (also referred to herein as "re-dial") (step 550), then the device 22 disconnects from the server 48 (step 560) and prepares to re-dial the server 48. As explained herein, the server 48 can return a status of "Done-call-back" if an error occurred at the server 48 or for another configurable reason.

If the status of the "Done" command is not "call-back" or "active," then it is treated as "inactive," and the device 22 disconnects from the server 48, remains inactive (step 650), and reports to the update control routine (FIG. 2) that the update was not successful.

Figure 4:
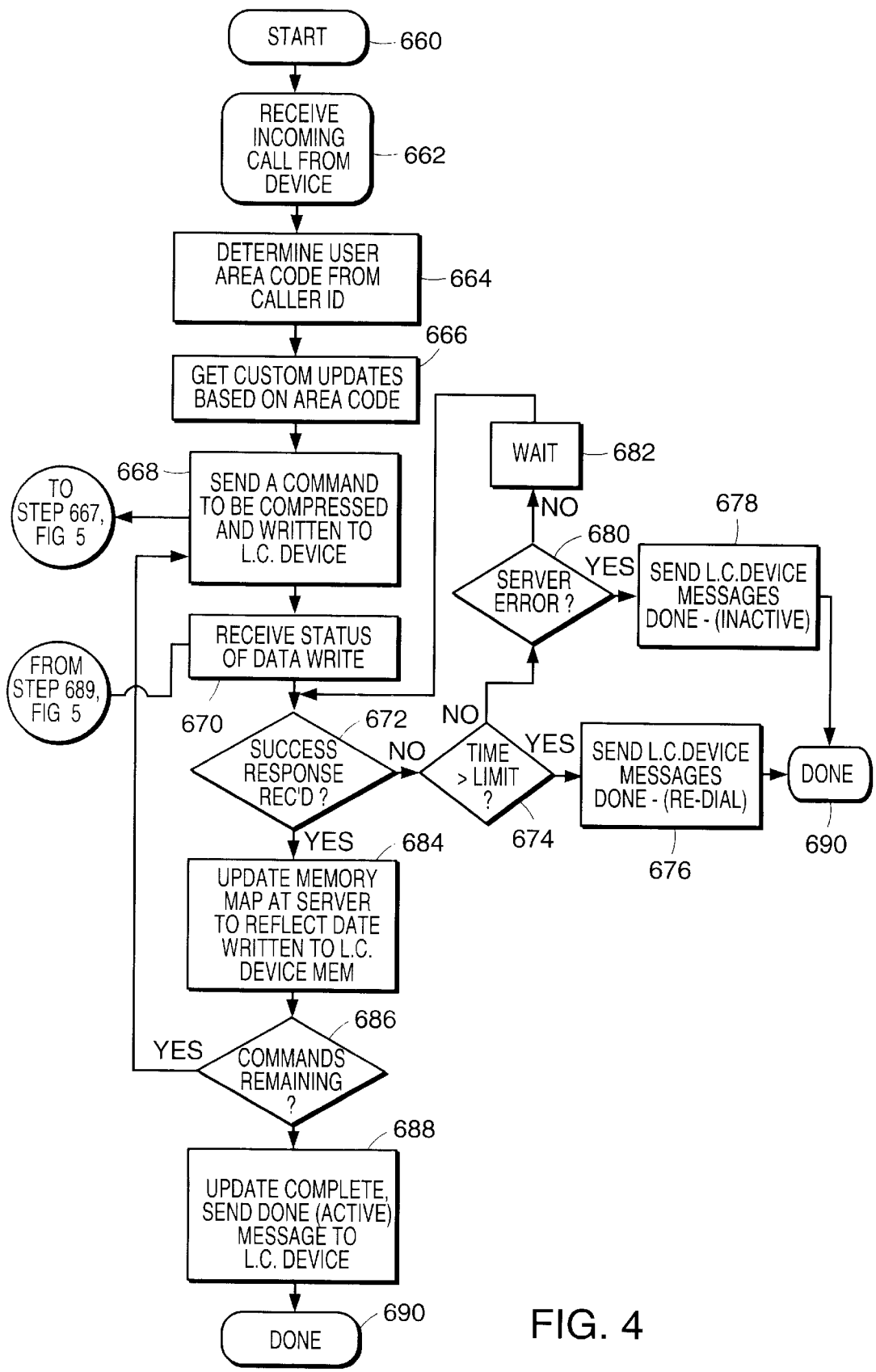
FIG. 4 is a flow chart representation of a method for updating a least cost call routing system, from the perspective of the server, in accordance with an embodiment of the invention.

FIG. 4 is a flow chart illustration of the update method of FIG. 3 as seen by the server 48. At the start (step 660), the server receives an incoming call from the device 22 (step 662). As explained previously in connection with FIG. 3, in one embodiment, the server 48 can determine the identity of the user via the Caller ID (step 664). Based on the area code that the device 22 is dialing from, the server 48 has a custom set of updates. For example a user residing in the "978" area code might have a different set of long distance carriers available to him than a user residing in the "213" area code. Accordingly, the server 48 prepares an update for the device 22 that is customized for the area code from which the device 22 is calling.

For every device update, the server 48 generates a customized set of commands to write the update data to the device 22. Because the device 22 has connected to the server 48 using a toll-free number, the server 48 is paying the cost of the call. Accordingly, it is desirable to minimize the length of time of the call as much as possible (This is discussed more fully below). This can be accomplished by compressing the data to be sent with each command so that the commands require as little bandwidth as possible. In addition, the bandwidth reduction can be accomplished by optimizing the number and type of commands to be sent to the device 22.

Referring to the embodiments of the invention of FIGS. 4 and 5, commands are compressed one by one by being processed using one or more compression routines (step 668) (FIGS. 7A–7B, and 9A–9D). The compression control routine in the embodiment of FIG. 5, upon receiving a command to be compressed (step 671) first runs a block compression method on the command (step 673) to locate all matching and non-matching blocks of data. This routine (as explained below in connection with FIGS. 7A and 7B) optimizes the number of blocks to be written during an upgrade by eliminating (if it can be done without adding overhead to the command) sending data that already matches data stored on the device 22.

After block compression is complete, the server 48 has discarded data that it does not have to send and has put into a specific cluster the blocks of data that must be sent to the device 22. The output of the block compression method is a Main Cluster (step 675) that is used as the input to the pattern compression method (step 677). Then, a pattern compression method (see FIGS. 9A–9D) is run (step 677) on the cluster to determine how to most efficiently write the data to the device 22. The pattern compression method is explained more fully in connection with FIGS. 9A–9D. The output of the pattern compression method an updated Main cluster (step 679) containing commands that are ready to be written to the device.

In one embodiment of the invention, after the pattern compression method is run, the server 48 breaks the blocks in the Main Cluster of step 679 down to improve the error detection and correction ability. For example, Main Cluster of step 679 might be a WRITE command that is writing 256 bytes of data to the device. Although this command was optimized as much as possible during the block compression (step 673) and pattern compression (step 677), the disadvantage in sending a block that large is that, if an error is detected during transmission, the entire block must be re-sent. However, the block is instead broken down into smaller chunks, so that if an error is detected in the chunk, then only that chunk need be resent. In one embodiment of the invention, the maximum size for a block is called a maximum transmission unite ("MTU") and is chosen to be 132 bytes. However, it should be understood that the MTU can be any size that is desired. It also should be understood that it is not necessary for the invention that WRITE commands exceeding a predetermined size be broken down to increase error correction. Those skilled in the art will understand the tradeoffs involved in doing so.

If, the Main Cluster is to be broken down to optimize error correction, then all of the blocks in the Main Cluster are checked to determine if any WRITE commands are present (step 681). If there are no WRITE commands, then the server 48 can proceed to transmit the data in the main cluster to the device 22 (steps 689–701). If the Main Cluster of step 679 contains one or more WRITE commands, then each WRITE command is checked to determine if the command is greater than the MTU (step 683). If the WRITE command is less than or equal to the MTU, then the server 48 can proceed to transmit the data in the main cluster to the device 22 (steps 689–701). If, however, a WRITE command is greater than the MTU, then server 48 breaks the command down into a plurality of WRITE commands, each command being less than or equal to the MTU (step 685). This is done for every WRITE command in the main cluster that exceeds the MTU. When all applicable WRITE commands have been divided, the MAIN cluster is updated to replace the original (greater than MTU) WRITE commands with the new (less than or equal to MTU) WRITE commands (step 687).

The command is sent to the device (step 689) and the server 48 waits a predetermined time (steps 693, 695) for a response from the device (step 691) indicating that the device 22 has processed the command. If a response is not received from the device 22 within a predetermined time, then the status of the command to the device 22 is unsuccessful for that command (step 697) and is reported as a failure to the update routine at the server (step 701 and FIG. 4). If, however, the server 48 receives a response from the device 22 indicating that the command was processed (step 699), then the status of the command that is reported to the device update routine of FIG. 4 is a success (step 701).

Referring again to FIG. 4, the server 48 receives its status of the command to the device 22 (step 670). If the status indicates that the command was not processed, the server 48 waits a predetermined time (step 674) to see if there was an error during compression of the command (step 680). If an error occurred, then the server 48 sends device 22 a message that the update is Done (inactive). Because the device 22 is inactive (step 678), it should re-dial because the update was not successful. If the server 48 does not receive indication that the device 22 processed the command within the time limit (step 674), and no server 48 errors occurred, then the server 48 sends the device 22 a message that the update is Done and that the device 22 should re-dial (step 676) because the update was not successful.

If, however, the server 48 receives a response indicating that the command written to the device 22 was processed by the device 22 (step 672), then the server 48 updates the memory map that it maintains corresponding to the memory on the device 22 to reflect the data written to the memory 24 of the device 22. That is, because the server maintains its own copy of what is in the memory of every device 22 belonging to a registered user, when the server 48 updates the memory on the device with new data, it must, correspondingly, update the memory in the memory map that it maintains for that device 22. It should be understood that, even though the server 48 knows in advance what updates must be provided to a device 22, it does not update its memory map to reflect those updates until it is sure that the device 22 has actually received and processed all commands relating to the update.

The server 48 continues compressing commands (step 686) until no more commands remain. When the server receives indication that all commands that it sent were processed, it send a "Done-active" message to the device 22 (step 688), indicating that the database on the device 22 is now updated and the device 22 is able to route calls using least cost routing.

Figure 6:
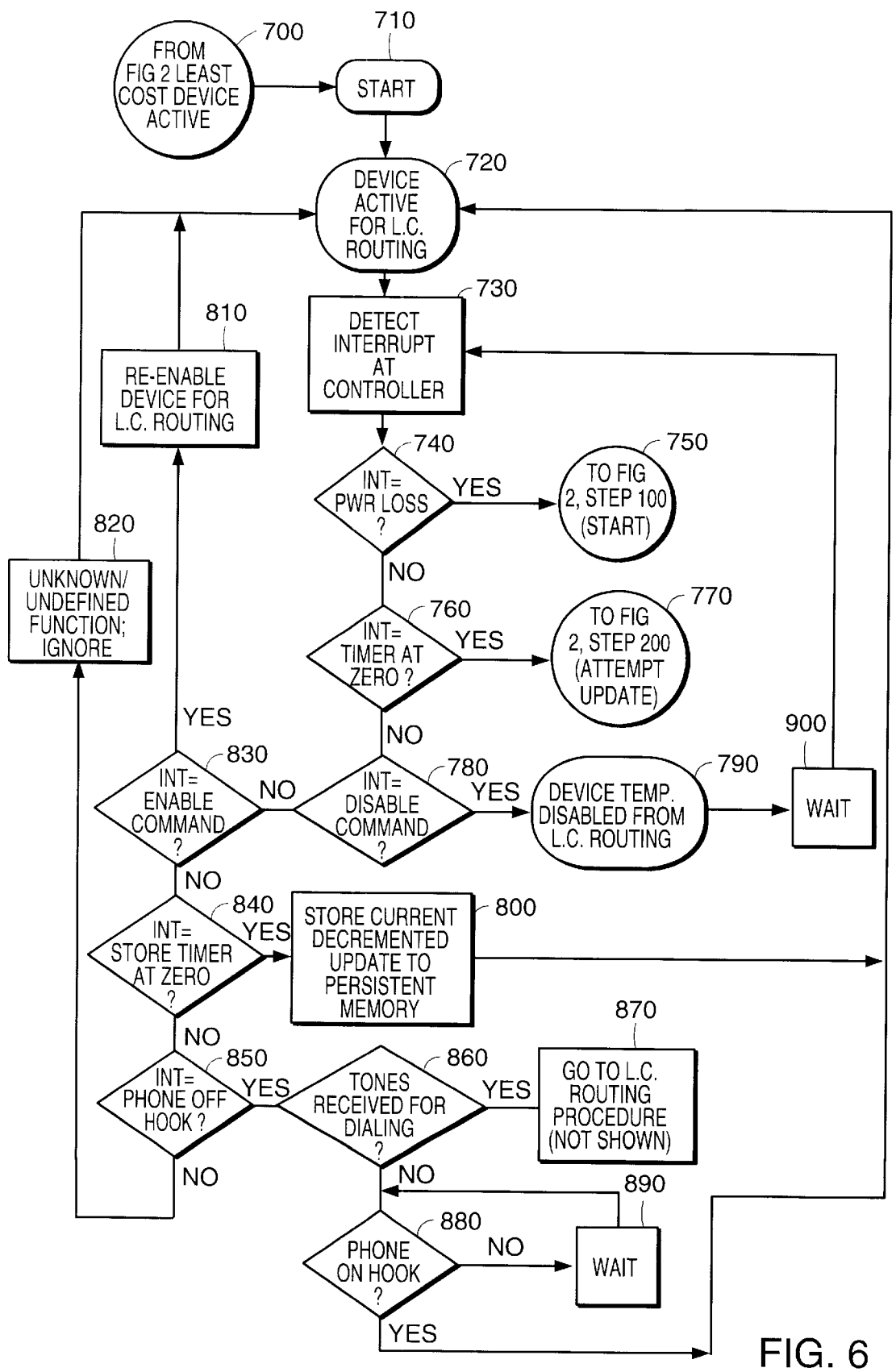
FIG. 6 is a flow chart representation of a method of operating a least cost call routing system, in accordance with an embodiment of the invention.

FIG. 6 is a flow chart representation of the operation of the device 22 when the device is "active." The device 22 is active when its database of least cost call routing data does not require updating. While the device 22 is active, the user can make calls and be assured that the calls will be routed in accordance with least cost routing data that is up-to-date. However, it should be understood that some of the steps detailed in FIG. 6 also apply when the device is in an "inactive" state. For example, when the device is "inactive," the controller will still be responding to interrupts such as power loss (step 740), and the update timer counting down to zero (step 760). When these events occur during the "inactive" state, the response of the device 22 will, in this embodiment, be the same as if the device were in an "active" state.

When the device is active (step 720) and its controller 20 receives an interrupt (step 730), the controller 20 attempts to determine how to respond to the interrupt. If the interrupt indicates that the device 22 has experienced a power loss (step 740), then the device 22 goes to the update control routine (step 750) of FIG. 2 to determine whether the database requires updating. This could occur, for example, during a power outage or if the device 22 temporarily is disconnected from power (unbeknownst to the user). Another interrupt can occur if, for example, the timer t2 of FIG. 2 reaches its limit, indicating that it is time for the device 22 to attempt to call the server 48 to update its database (step 760). When this occurs, the device 22 goes to the update control routine (step 750) of FIG. 2 to determine whether the database requires updating.

If the device 22 receives a "disable" command (step 780), then the device is being told by the user that the user wants to disable the least cost routing feature temporarily (step 790). This can occur, for example, when the user wants to dial special types of numbers, when the user wants to use a specific or default long distance carrier, or for any other reason that the user desires. Typically, the device can be enabled or disabled by the user's pressing a particular unique sequence of keys on the telephone. When the device 22 receives a disable command, the device remains in the disable state (step 900) until the controller 20 receives a new interrupt (step 760), such as an "enable" command (step 830). The "enable" command typically also can be accomplished by the user pressing a unique sequence of keys on the telephone. When the device receives an "enable" command, the device is re-enabled for least cost routing (step 810).

It should be understood that the "inactive" state for the device 22 is not the same as the "disabled" state for the device 22. In the "inactive" state, device cannot be used for least cost routing until its database is updated to be current (that is, until it receives a "Done-Active" command from a server 48). In contrast, when the device 22 is in the "disabled," state, the least cost routing feature is only temporarily disabled, and can be restored to an "active" state by sending an "enable" command to the controller.

Another interrupt that the controller 20 on the device 22 can receive is an interrupt (step 840) indicating that it is time to store the internal value that keeps track of when an update is due (called the "decremented update") to persistent memory (step 800). For example, if the update period that server 48 has provided to the device 22 is thirty days, then once each day, the controller 20 may save the present value of the update period (e.g., day 20 of 30, day 21 of 30) to persistent memory 24. In one embodiment, this is done so that, if the device 22 loses power, when power is restored the device 22 is able to determine if it needs to be updated. In another embodiment, the decremented update is stored so that, at any time, an accurate checksum (see FIG. 2) can be computed.

Yet another interrupt that the controller 20 can detect is if any of the phones 12a, 12b (see FIG. 1) attached to the device 22 are in an off-hook state (step 850). If this occurs, the controller 20 first determines if any tones are received (step 860), indicating that the user is attempting to make a call. If the controller 20 detects an off-hook state without tones (step 880), then the controller must wait (step 890) until the phone is put back on the hook, at which point the device remains active (step 730).

If the controller does not recognize the interrupt (step 820), then the device remains in an active state (step 720), waiting for an interrupt that the controller does recognize.

Figure 7A:
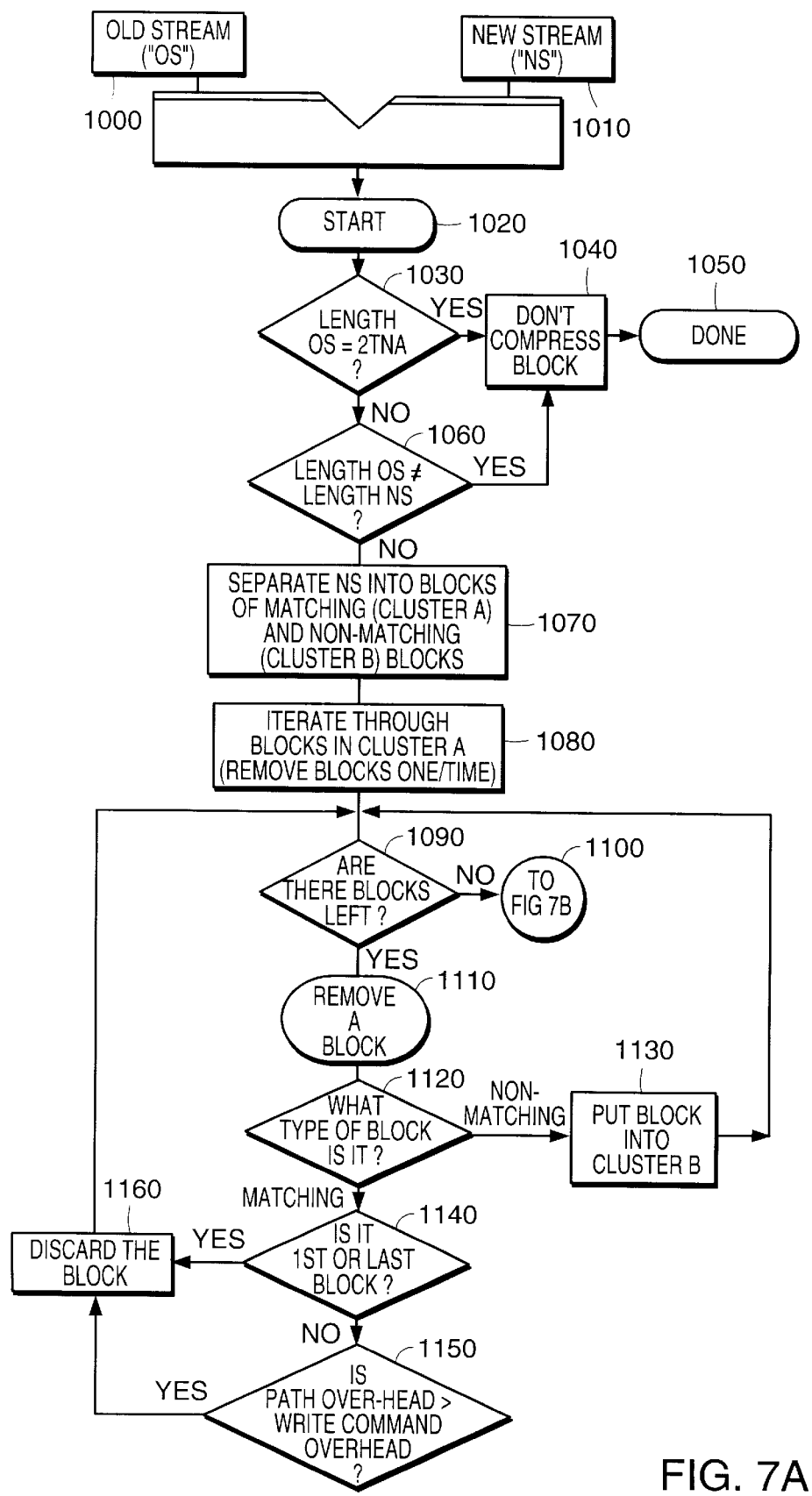
FIGS. 7A–7B together are a flow chart representation of a method for compressing the number of blocks of data written during an update from a server to a least cost call routing device, in accordance with an embodiment of the invention.
Figure 7B:
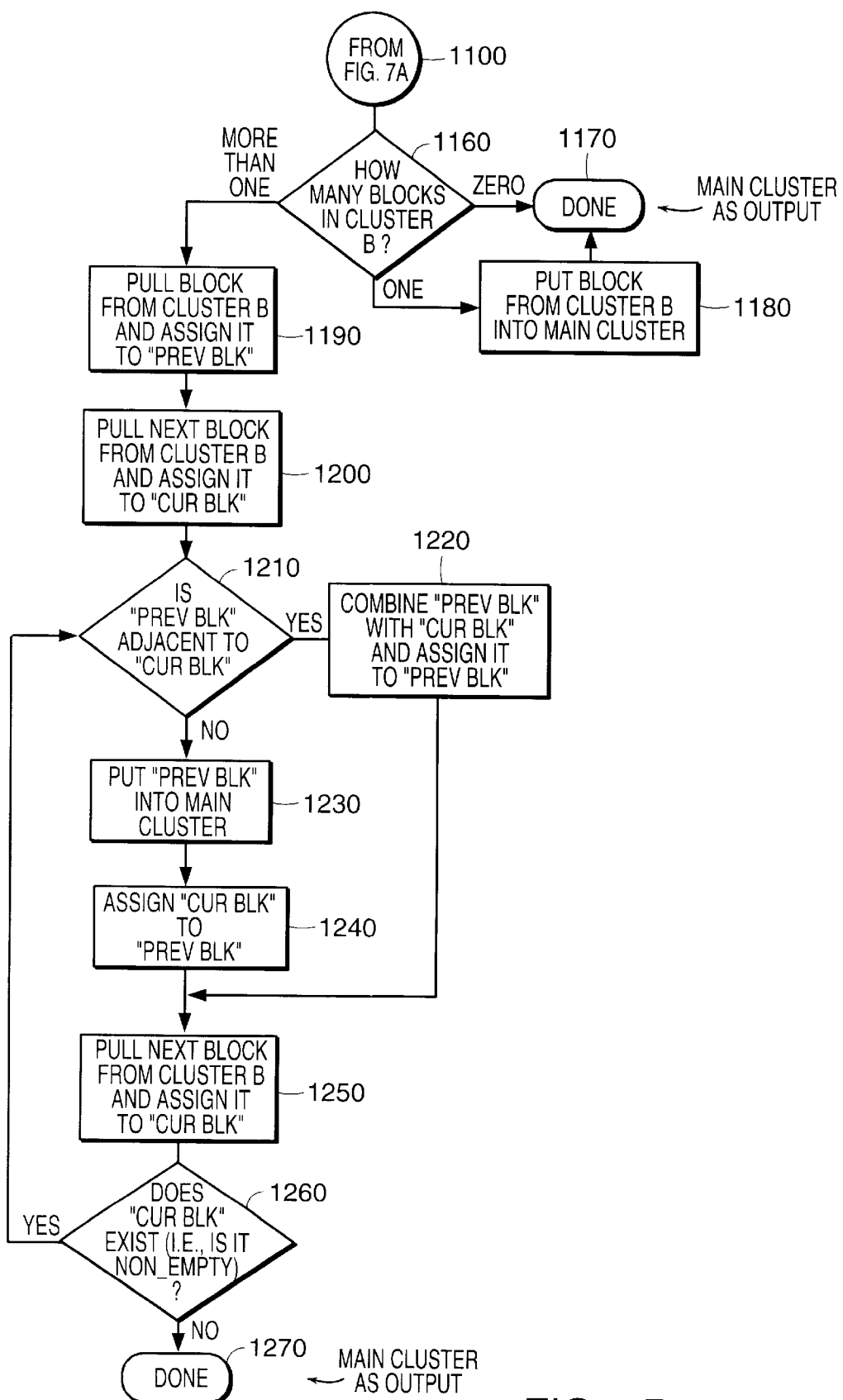

FIGS. 7A and 7B together are a flow chart representation of the block compression method that is executed at the server 48 during step 673 of FIG. 5. The server 48 optimizes the data that it must send to the device 22 so that the data can be sent in the shortest time possible. The method of FIG. 5 optimizes the number of the blocks that it sends to a particular memory location on the device 22 by compressing the data in each command. This is done by sending only non-matching data (that is, update data that does not match data that is already in the device 22's memory 24) and matching data that is more efficient to send than in a single command than to break up into several commands. This is explained more fully below.

When the block compression method of FIG. 7A–7B is initiated, it requires two inputs, an "old stream" and a "new stream," The "old stream" is provided by the server 48 and consists of a copy of the data that currently is stored in a particular location in the memory 24 of the device 22. The server 48 knows the data that is stored at each location on the memory 24 of the device 22 because, as discussed previously, the server maintains a unique memory map for each device 22 that can access the server 48. During the updating of the device 22, the server 48 updates a memory map that it maintains to reflect each command that was successfully written to the device 22 (see step 684, FIG. 4). Thus, for a given command that is to be compressed, the server 48 can provide an "old stream" representing the data already in the device memory 24.

The "new stream" is what the server 48 considers to be the latest data for a particular memory location. When the server 48 obtains the latest telephone call rate information from telecommunications carriers 18a, 18b, 18c, the server 48 also identifies which area codes affected by the newest information. For example, if carrier 18a offers service to callers from all area codes, then if any device 22 from any area code calls in for an update after carrier 18a has provided new rate information to the server 48, then at least one "new stream" related to the new information from carrier 18a is generated for every update call that is received at the server 48, until all devices 22 that have access to the server 48 have received the update related to carrier 18a.

After getting the "old stream" and the "new stream" for a particular memory location (step 1020), the server 48 performs some preliminary checks to determine if block compression is applicable at all. For example, if the length of the "old stream" is zero (step 1030), then this indicates that there is no data in the memory location and that all data in the "new stream" is needed at the device 22. Thus, block compression cannot be run on the stream (step 1040), so the block compression method ends (step 1050). It should be understood that as illustrated in FIG. 5, the pattern compression method (step 675 of FIG. 5 and FIGS. 9A–9D) can still be run even on streams that cannot be block compressed.

The old stream and new stream are then compared (step 1060) to determine if they are the same length (they should be). If the old and new streams are not equal in length, the stream is not compressed (step 1040). Typically, when the streams are not the same length, an error has occurred in one or both of the streams, and block compression may compound this error.

If the old stream has non-zero length and both the old and new streams are the same length, then the block compression method can begin executing. First, the new stream is compared with the old stream so that the new stream can be separated into blocks of matching blocks and non-matching blocks (step 1070). This is accomplished in steps 1090–1150. To keep track of the matching and non-matching blocks, the method temporarily stores matching blocks in a first cluster (called cluster A, in this embodiment) and non-matching blocks in a second cluster (called cluster B, in this embodiment) (step 1070). Each block is checked one at a time (steps 1080, 1090, 1110) until all blocks have been checked.

If a block is checked and it is found to be "non-matching," (that is, the information at a particular location in memory does not match the information at the same location in memory) then it is put into cluster B (step 1130). This means that the data definitely should be written to the device 22, because the device 22 does not already have the data.

If a block is checked and it is found to be "matching," then it is checked to determine if it is the first or the last block in the stream (step 1140). If it is the first or last block, it can be discarded (step 1160). If the block is not the first or last block, the data overhead for the block is compared to its write overhead. As explained below, the block is discarded (step 1160) if the data overhead exceeds the write overhead.

Overhead is measured in nibbles (4 bits). Each nibble corresponds to the server 48 sending one DTMF digit to the device 22. It takes two nibbles to send one byte. The data overhead is the amount of overhead that it takes to send a series of data. Thus, the data overhead can be calculated as:

$$\text{Data Overhead (in nibbles)} = (\text{Number of bytes}) * 2 \qquad (1)$$

The WRITE command overhead is fixed at 37 nibbles. The write overhead is the amount of overhead that it takes to issue a WRITE command. Thus, for a given block of data, it is possible to determine whether the data overhead is greater than the WRITE command overhead and to determine whether it is more efficient to send the block as part of a larger WRITE command or to separate out and discard the block (step 1160). This is best understood by way of example:

Assume that the old stream and new stream are:

$$\text{OldStream (@ address 0x100)} =$$
$$000000\text{FFFFFF}123456000000\text{FFFFFF}123456 \qquad (3)$$

$$\text{NewStream (@ address 0x100)} =$$
$$000000\text{FFFFFFABCDEF}000000\text{FFFFFFABCDEF} \qquad (4)$$

As can be seen above, there are parts of the two data streams that are identical and parts that are different. Referring to steps 1030–1060 of FIG. 7A, because the old stream is not all zeroes and because the streams are the same length, compression can occur. First, the new stream is compared to the old stream so that the new stream can be separated into blocks of matching and non-matching blocks (step 1670). To start, all of the blocks initially are in Cluster A, and the method iterates through each block, one block at a time (step 1080). Cluster A, before iteration, looks like:

$$\text{Cluster A [Block 0, Matching, @0x100, 000000FFFFFF]} \qquad (5)$$
$$\text{[Block 1, Non-Matching, @0x106, ABCDEF]} \qquad (6)$$
$$\text{[Block 2, Matching, @0x109, 000000FFFFFF]} \qquad (7)$$
$$\text{[Block 3, Non-Matching, @0x110, ABCDEF]} \qquad (8)$$

It should be understood that, in this embodiment, there should not be two successive blocks of the same type at this stage of the compression processing (e.g., there would not be two "matching" blocks in a row, because the method of FIG. 7A would have made them both into a single "matching" block.

Referring again to the method of FIG. 7A, when Block 0 is removed from cluster A (step 1110) because it is a matching block (step 1130), and the first block (step 1140), it is discarded (step 1160). Next, because there are still blocks left (step 1090), Block 1 is then removed (step 1110). Because this block is non-matching, it is put into Cluster B (step 1130). With blocks still left (step 1090), Block 2 is then removed (step 1110). Block 2 is a matching block, but is not the first or last block (step 1140), so this block is checked to determine whether the data overhead for this block exceeds the WRITE overhead (step 1150). This can be done using (2) above. If it does, the block will be discarded (step 1160).

Block 2, at (7) above, consists of 12 DTMF digits, hence 12 nibbles, or 6 bytes of data. Thus, the data overhead for sending the block in (2) above is 12. However, because WRITE overhead always has 37 nibbles, the data overhead is less than the WRITE command overhead. By doing the comparison of step (1150), the method determines that it is more efficient, in this example, to send the Blocks 1, 2, and 3 together as one command, versus having two separate WRITE commands for just the non-matching blocks 1 and 3. If, however, Block 2 were 20 bytes long, then the data overhead would be 40 nibbles (using equation (1)). Because 40 nibbles exceeds the WRITE command overhead of 37 nibbles, Block 2 would be discarded because it is more economical to have separate WRITE commands for Blocks 1 and 3 than a single WRITE command for Blocks 1, 2, and 3.

Referring again to FIG. 7A, when the method has finished going through all of the blocks in Cluster A (step 1090), the result is a Cluster B containing zero or more blocks. Referring to the example above, the Cluster B generated by the method of FIG. 7A would be:

$$\text{Cluster B [Block 1, Non-Matching, @0x106, ABCDEF]} \qquad (9)$$
$$\text{[Block 2, Matching, @0x109, 000000FFFFFF]} \qquad (10)$$
$$\text{[Block 3, Non-Matching, @0x110, ABCDEF]} \qquad (11)$$

Referring now to FIG. 7B, Cluster B is checked to determine how many blocks it has (step 1160). If cluster B has zero blocks (step 1170), then the method is complete. If Cluster B has just one block (step 1180), then block in Cluster B is put into a Main Cluster (step 1180), which is used by the pattern compression method of FIG. 5, step 675. Because the new stream was iterated through in sequential order (step 1080, FIG. 7A), the blocks created for Cluster A are in sequential order before they were checked in steps 1090–1150, and therefore the Cluster B that was created has blocks in sequential order.

If Cluster B has two or more blocks, then the first two blocks in Cluster B (steps 1190, 1200) are checked to see if they are adjacent (step 1210). If they are adjacent, they can be combined into a single block (step 1220). If not, then the first block that was checked (the block assigned to "previous block" in step 1190) cannot be adjacent to any other blocks in Cluster B. Thus, that first block that was checked can be put into the Main Cluster (step 1230), so that it eventually can be passed to the pattern compression method (see FIG. 5, step 675). When the first block that was checked is removed from the "previous block" (step 1230), the second block that was checked (that currently is in the "current block" (step 1200)) is moved to the "previous block" (step 1240), and the next block from Cluster B is removed and assigned to the "current block" (step 1250). If the "current block" exists (i.e., is non-empty), then the adjacency test and resultant combination or moving of blocks (steps 1210–1250) is repeated. This continues until no more blocks remain in Cluster B (step 1260). A Main Cluster, which may or may not have blocks in it (depending on whether Cluster B had any blocks in it at the start) is then provided as an output of this method (step 1270).

Referring to the examples provided in (2) through (10) above, if the following Cluster B were provided at step 1100 of FIG. 7B:

Cluster B [Block 1, Non-Matching, @0×106, ABCDEF]     (9)

[Block 2, Matching, @0×109, 000000FFFFFF]     (10)

[Block 3, Non-Matching, @0×110, ABCDEF]     (11)

after steps 1100 through 1270 of FIG. 7B, the resultant main cluster would look like:
Main cluster

[Block 1, @0×106, ABCDEF]     (12)

[Block 2, @0×109, 000000FFFFFFABCDEF]     (13)

As illustrated above, Block 3 was combined into Block 2 because the blocks were adjacent.

FIG. 8A–8K are examples of messages and commands used for communication in one embodiment of the present invention. In this embodiment of the invention, communications protocol is nibble oriented (where a nibble is 4 bits), so the data types are based on the nibble. Unless otherwise noted, all data types are unsigned.

For data types called "byte," the value of the data type is 2 nibbles. For data types called "address," the value of the data type is 3 nibbles. For data types called "length," the value of the data type is 3 nibbles. For data types called "dbyte," the value of the data type is 4 nibbles.

FIG. 8A illustrates the standard format of a message in the present invention. All messages follow a standard formatting sequence. The smallest unit of information is a nibble because this can easily be mapped into the 16 character set of the DTMF tone grid used with the device 22 of the invention. Every message contains the standard header, followed by the parameter list associated with that particular command. In some embodiments, a checksum (discussed later) component is included so that line errors (or other transmission problems) can be identified.

Referring again to FIG. 8A, the standard format consists of two fields. The first field included in the header is the message type (MT) 1455, which has a value of one nibble. The parameter list 1458 is the parameter list associated with the particular command. The second field in the standard format is in the footer and is an error checking code 1460. In the embodiment illustrated in FIG. 8A, the error checking code 1460 is called "Chksum" and has a value of "dbyte" (i.e., 4 nibbles). In one embodiment of the invention, the error checking code 1460 is a "dbyte" that carries a 16 bit cyclic redundancy code (CRC16) for the command.

FIG. 8B is a table illustrating a set of commands used in one embodiment of the invention. This table should not be construed to be limiting, however. Those skilled in the art will recognize that other types of commands are usable within the spirit and scope of the invention. The table is representative of the types of messages that a recipient can expect and contains messages applicable to either or both of the server 48 and the device 22 (referred to in the table as a client). Under the heading "direction," s-c refers to commands used in the server-client direction, c-s refers to commands that are used in the client server direction, "bidir" refers to commands that can be used in either the client-server or server-client direction, and "na" refers to non-applicable/undefined commands.

FIGS. 8C through 8K provide further information about each of the commands in the table of FIG. 8B, in accordance with one embodiment of the invention. Each command has specific parameters and return values associated with it. The "postop" field for each command describes any post operations that occur immediately after the transmission of the current command. For example, the postop indicates that after the WRITE command is transmitted a DATA command is being transmitted. It should be understood that the command descriptions in FIGS. 8C through 8K are provided by way of example only, and that those skilled in the art will recognize that these and other applicable commands can be implemented in many ways within the scope of the invention.

FIGS. 9A–9D together are a flow chart representation of a pattern compression method, in accordance with one embodiment of the invention. The pattern compression method is used to further optimize the command to be sent to the device 22 by determining which type of command (from the command set of FIG. 8B) can write the data to the device 22 with the least overhead. For example, the method of FIGS. 9A–9D can determine whether a command should be written using a WRITE command (which, as was discussed previously, has an overhead of 37 nibbles) or using a SET command (which, in this embodiment of the invention has 22 nibbles).

As an example, certain types of commands, such as commands that are sending a plurality of adjacent, identical DTMF digits, (e.g., a string of twenty zeroes) can be sent using either a WRITE or a SET command. For example, suppose that the server 48 needs to send the same DTMF digit to twenty adjacent memory locations (e.g., BBBBBB . . . , etc.) beginning at memory location 100. It is more efficient, instead of sending twenty WRITE commands, each sending the data "b" to a memory location, to instead use the SET command to set a certain range of memory locations, beginning at a specified memory location, to a particular value. This type of optimization is just one of the optimizations that the pattern compression method of FIG. 9A–9D accomplishes.

Figure 9A:
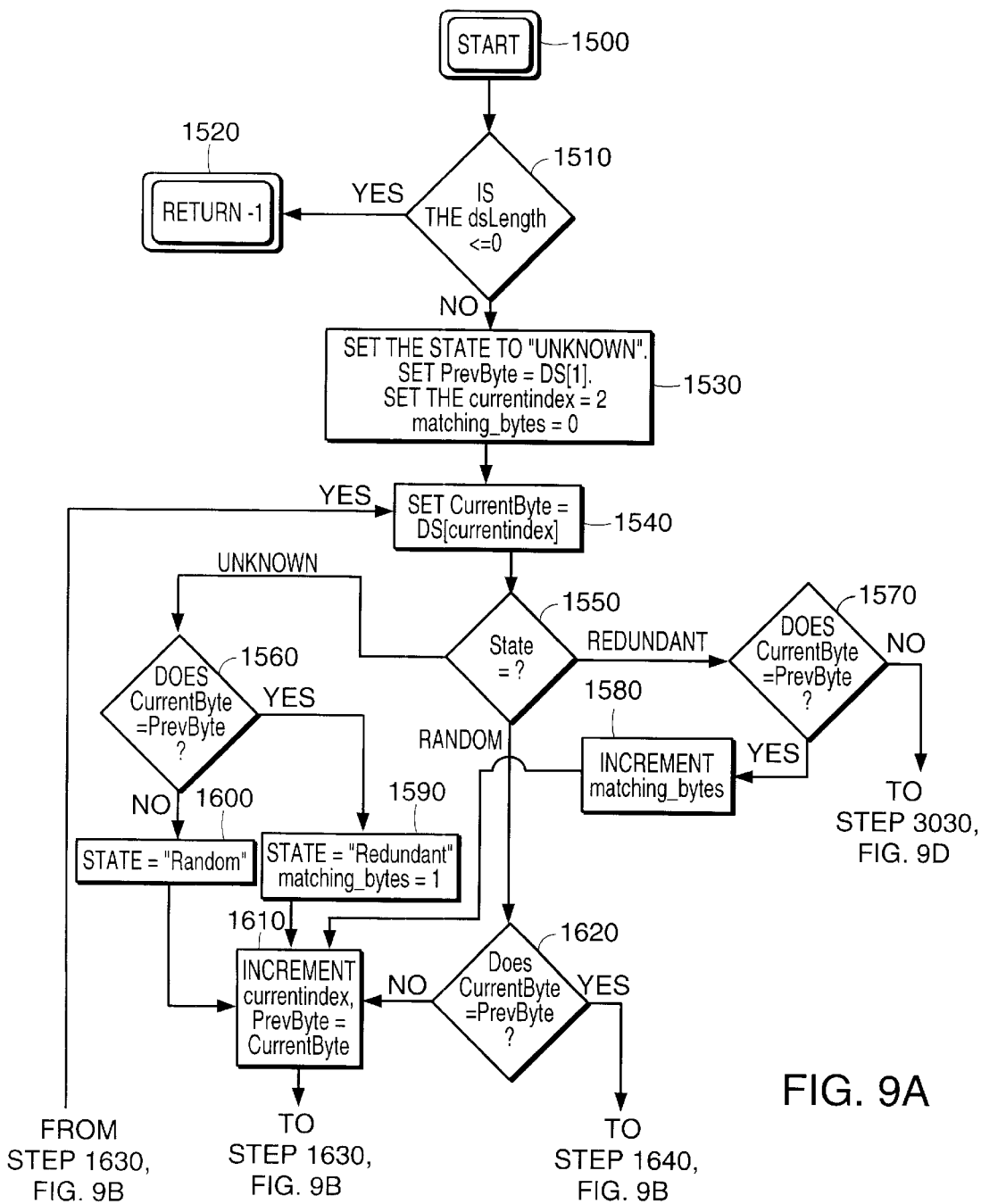
FIGS. 9A–9D together are a flow chart representation of a method for compressing the number of bytes of data that are written during an update from a server to a least cost call routing device, in accordance with an embodiment of the invention.

Referring to FIG. 9A, at the start (step 1500), the pattern compression method receives a single block from the Main Cluster of step 679, FIG. 5 (pattern compression is, in this embodiment, run on a block by block basis). When the method receives the block, it determines if the length of the stream of data in the block is greater than zero (step 1510). If it is not, then the method stops (step 1520) because there was no data to compress, and returns a value of −1. If the data stream length was greater than zero, then the state of the data stream length is set to "unknown," the internal variable PrevByte is set to DS[1], the internal variable current index is set to two, and the internal variable matching_bytes (a matching byte counter) is set to 0 (step 1530). Then, the internal variable CurrentByte is set to DS[currentindex] (step 1540). The method is now checking the bytes in the data stream, one by one, in sequential order, to determine whether it can locate adjacent, identical data.

Referring again to FIG. 9A, if, the state of the current byte (step 1550) is redundant, then the method checks whether the CurrentByte is equivalent to the PrevByte (step 1570), indicating that adjacent, identical bytes have been located. If the determination of step 1570 is Yes, then the matching_bytes counter is incremented (step 1580), the currentindex is incremented (step 1610), the PrevByte is set to the CurrentByte (step 1610), and the current index is checked to determine whether it has reached the end of the data stream (step 1630, FIG. 9B). If the answer to step 1630 is Yes, then the CurrentByte is set to the DS[current index] (step 1540) and the method again checks the state of the current byte (step 1550).

If the state of the CurrentByte is "Random," then the Current Byte is checked to see if it is equivalent to the PrevByte (step 1620). If the answer to step 1620 is No, then the currentindex is incremented (step 1610), the PrevByte is set to the CurrentByte (step 1610), and the current index is checked to determine whether it has reached the end of the data stream (step 1630, FIG. 9B).

Referring to FIG. 9A, if the state of the CurrentByte (step 1550) is Unknown, then the CurrentByte is checked to determine if it is the same as the PrevByte (step 1560). If the answer to step 1560 is No, then the State of the CurrentByte is set to "Random." If the answer to step 1560 is Yes, then the State of the CurrentByte is set to "Redundant," and the matching-bytes counter is set to 1 (step 1590). Then, the method proceeds to step 1610, which was described above.

Figure 9B:
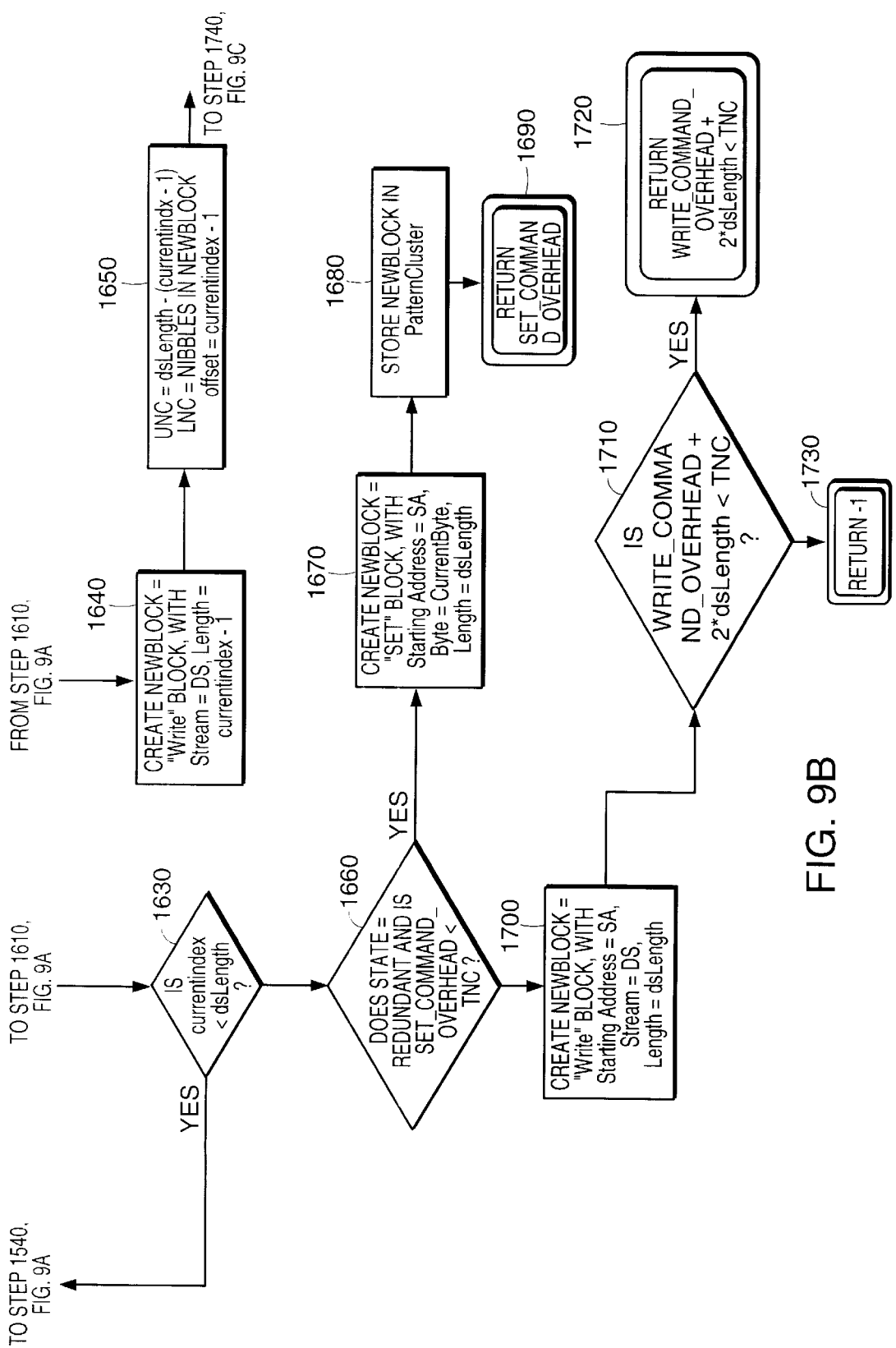

If the state of the CurrentByte (step 1550) is "Redundant" and the CurrentByte is the same as the PrevByte (step 1570), then the method creates a NEWBLOCK as a "Set" block, having a starting address SA, a byte of PrevByte, and a length equal to the matching_bytes count (step 1640, FIG. 9B). Then, the method computes the UnoptimizedNibble-Count ("UNC") as the difference between the dsLength and the (currentindex −1) (step 1650). The method then proceeds to check whether the UNC is greater than zero (step 1740, FIG. 9C), which is discussed in more detail below.

Referring to FIG. 9B, if the currentindex is not less than the dsLength (step (1630), then the end of the data stream has been reached. Thus, the method checks whether a condition is met wherein the State of the CurrentByte is "Redundant" and the SET_COMMAND_OVERHEAD is less than the Target Nibble Count (TNC) (step 1660). If the condition is met, then the method creates a block NEWBLOCK as a "Set" block, having a starting address SA, the byte being the CurrentByte, and the length being the dsLength (step 1670). The NEWBLOCK is stored in the Pattern Cluster (step 1680) (which is an output of the pattern compression method), and the method returns the SET_COMMAND_OVERHEAD (step 1690).

If, however, the condition of step 1660 is not met, then the method creates a NEWBLOCK as a "Write" block, having a starting address SA, a stream of DS, and a length of dsLength (step 1700). Then, the method determines whether the sum of two times the dsLength plus the WRITE_COMMAND_OVERHEAD is less than the TNC (step 1710). If the answer to step 1710 is Yes, then the method returns the value of two times the dsLength plus the WRITE_COMMAND_OVERHEAD as being less than the TNC (step 1720). If the answer to step 1710 is No, then the method returns a −1(step 1730) for this command, and the method begins at step 1500 of FIG. 9A for the next block in the Main Cluster.

Referring again to step 1620 of FIG. 9A, if, for a CurrentByte having a "Redundant" state, if the CurrentByte is the same as the PrevByte, then a block NEWBLOCK is created (step 1640, FIG. 9B). The NEWBLOCK is a "Write" block with a starting address of SA, a stream DS, and a length equivalent to the currentindex−1. The method then computes the UnoptimizedNibbleCount ("UNC") as being the difference between the dsLength and the (currentindex −1), sets the LocalNibbleCount ("LNC") as the number of nibbles in the NEWBLOCK, and sets the offset to be the currentindex−1 (step 1650). Then, referring to FIG. 9C, the UNC is checked to determine its value (step 1740).

If the outcome of step 1740 is zero, then the BestCaseScenario ("BCS"), that is, the best optimization that can be achieved with the pattern compression method, is the LNC. If the outcome of step 1740 is a number greater than zero, then the BSC is the sum of the LNC plus the SET_COMMAND_OVERHEAD (step 1760).

From the BCS calculated in either step 1750 or step 1760, the method then computes a WorstCaseScenario ("WCS") as the sum of the LNC and the UNC (step 1770). This WNC is then checked to determine whether it is less than the TNC (step 1780) If the outcome of step 1780 is Yes, then the method reaches what this embodiment refers to as Case 1 (step 1790).

In Case 1, the current WCS is less than the TNC that was passed into this part of the method. This means that no matter what the outcome of subsequent optimizations, the method will always be able to achieve a result that is more optimal than the unoptimized stream as it was passed in originally. Thus, the method uses this step in the process as the current optimization.

Referring again to FIG. 9C, step 1790, when the method is operating under Case 1, it defines a Temp variable that sets up parameters (step 1800) to pass to the next (recursive) iteration of the pattern compression method: PatternCompressionAlgorithm(SA+offset, DS+currentIndex, dsLength-offset, LocalClusterB, UNC). That is, referring to the Inputs to the pattern compression method listed in FIG. 9A, for the StartAddress SA, the Temp variable uses the SA+offset, for the datastream DS the temp variable uses the DS+currentindex, and for the DataStream-Length dsLength the Temp variable uses the dsLength-offset. The source is LocalCluster B, and the UNC is passed so that the method knows the UNC of the data remaining to be optimized. The LocalClusterB is then added to the LocalCluster (step 1810). In step 1820, the method calls itself (step 1500 et seq.) and checks to determine if it returns a value of −1. If the outcome of step 1820 is Yes, then the OptimizedNibbleCount ("ONC") is defined as the LocalClusterB overhead (step 1830). That is, the method ignores the second call to the pattern compression method that it made in Step 1820, because the optimization that it already performed is the better optimization. If the outcome of step 1820 is No, then the ONC is defined as whatever Temp returned to it (step 1840), meaning that the subsequent optimization improved over the previous optimization.

Figure 9C:
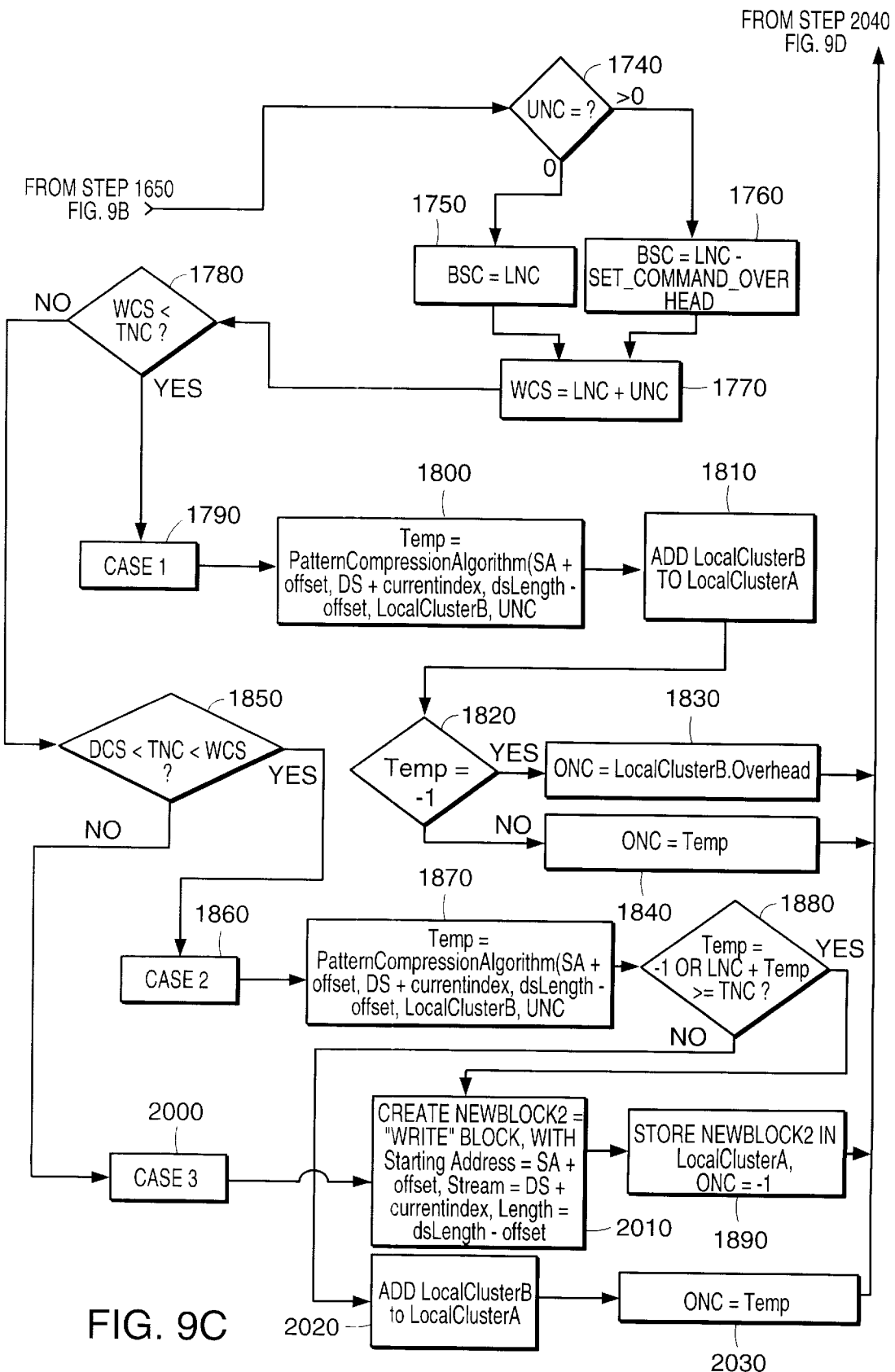
Figure 9D:
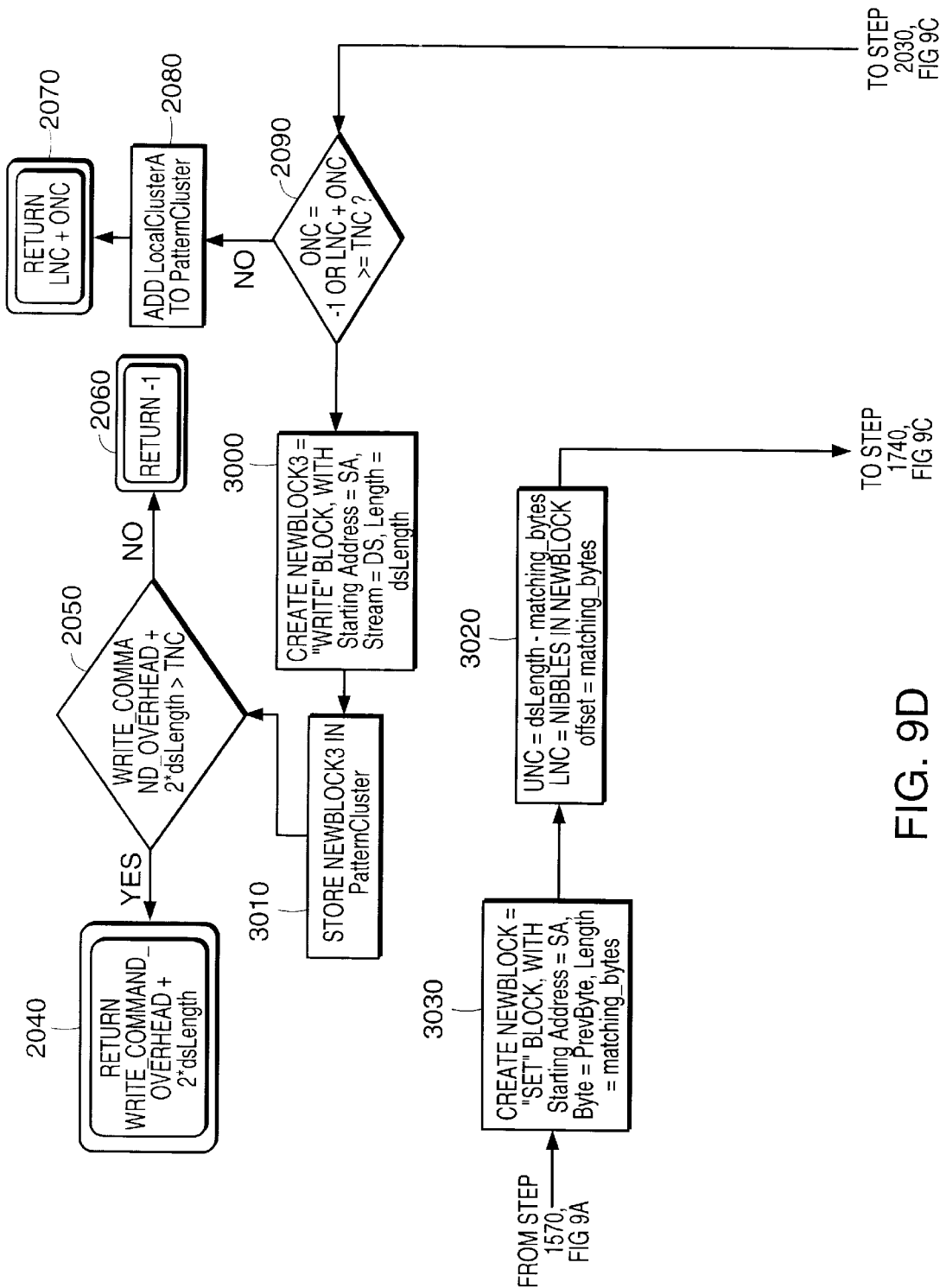

Referring again to Step 1780 of FIG. 9C, if the WCS is not less than the TNC, then the method checks to see if the TNC is both less than the WCS and greater than the BCS (step 1850). If the answer to step 1850 is Yes, then the Case 2 analysis (step 1860) is used, and if the answer to step 1850 is No, then the Case 3 analysis is used (step 2000). Each of these analyses is discussed below.

Case 2 (step 1860) refers to a situation where the worst case scenario (WCS) is worse than the unoptimized stream, but the best case scenario (BCS) is better than the unoptimized stream. The method cannot predict whether it can achieve the BCS yet, nor can it predict whether it can achieve a result better than the TNC. Thus, the method must call itself again recursively. Referring to FIG. 9C, the method defines a Temp variable that sets up parameters (step 1870) to pass to the next (recursive) iteration of the pattern compression method: PatternCompressionAlgorithm(SA+offset, DS+currentindex, dsLength-offset, LocalClusterB, UNC). When the recursive call to the pattern compression method (step 1500 of FIG. 9A) is complete, the method looks for one of two conditions to be met: either the Temp returned a value of −1 or the sum of the value that Temp returned, plus the LNC, is greater than or equal to the TNC (step 1880).

If either of the conditions in step 1880 are met, then a NEWBLOCK2 is created as a "Write" block, with a starting address of SA+offset, a stream of DS+currentindex, and a Length of dsLength-offset (step 2010). The NEWBLOCK2 is then stored in LocalClusterA, and the ONC is set to −1 (step 1890). If neither of the conditions in step 1880 are met, then the LocalClusterB is added to the LocalClusterA (step 2020), and the ONC set to the value returned by Temp (step 2030).

Case 3 (step 2000) refers to a situation where the BSC is worse than the unoptimized stream. The pattern compression method cannot improve upon the unoptimized stream, so it lets the method that called it (e.g., FIG. 5, step 677) know that the pattern compression could not achieve better results than the unoptimized stream. Following a determination of Case 3 (step 2000), the method creates a NEWBLOCK2 in step 2010, as described above.

When the ONC is finally set to a value (see steps 1840, 1880, 1890, and 2030 of FIG. 9C), the pattern compression method then checks to see if at least one of two conditions is met: either the ONC has a value of −1 or the sum of the LNC and the ONC is greater than or equal to the TNC (step 2090). If the outcome of step 2090 is No, then the LocalClusterA is added to the PatternCluster (step 2080), and the pattern compression method returns the sum of the LNC and the ONC (step 2070).

If, however, the outcome of step 2090 is Yes, then the method creates a NEWBLOCK3 as a "Write" block, with a starting address of SA, a stream of DS+currentindex, and a Length of dsLength (step 3000). The NEWBLOCK3 is stored in the PatternCluster (step 3010). Then, the method checks whether the sum of the WRITE_COMMAND_OVERHEAD and two times the dsLength is greater than the TNC (step 2050). If the answer is Yes, then the method returns a value of WRITE_COMMAND_OVERHEAD+ 2* dsLength (step 2040). If the answer to step 2050 is No, then the method returns −1 (step 2060).

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the following claims.

What is claimed is:

1. A method for compressing the number of blocks of data written during an update from a server to a remote device capable of routing telephone calls along a least cost route, the remote device comprising a first memory, a dialer, and a controller, comprising the steps of:

(a) receiving at the server an update request from the remote device;
    (b) providing a first data stream at the server comprising a memory map of data currently stored in the memory of the remote device;
    (c) providing a second data stream at the server comprising data that is to be written to the memory of the device, the second data stream being of the same length as the first data stream;
    (d) separating the second data stream into a plurality of blocks and assigning to a first cluster all blocks having data that does not match the data at a corresponding location in the first data stream;
    (e) discarding, from the blocks remaining in the second data stream, the first and last blocks and all blocks larger than a predetermined size;
    (f) assigning the blocks remaining in the second data stream to the first cluster;
    (g) combining the blocks of the first cluster that are adjacent to one another into an adjacent block, wherein the adjacent block comprises a plurality of blocks, that each are adjacent to at least one other block in the adjacent block;
    (h) assigning all adjacent blocks and any blocks remaining in the first cluster to a second cluster; and
    (i) writing the second cluster from the server to the remote device in response to the update request.

2. The method of claim 1, wherein step (e) further comprises the step of discarding, from the blocks remaining in the second data stream, all blocks for which the overhead for sending the data in the block is greater than the overhead associated with a write command.

3. The method of claim 1, wherein step (g) further comprises the steps of:

(i) assigning a first block from the first cluster to a first location and assigning a second block from the first cluster to a second location;
    (ii) combining the blocks assigned to the first and second locations and assigning them to the first location, if the first and second blocks are adjacent;
    (iii) assigning the block in the second location to a second cluster, if the first and second blocks are not adjacent;
    (iv) repeating steps (i) through (iii) for all blocks in the first cluster until the second location is empty; and
    (v) assigning the block in the first location to the second cluster.

4. A method for compressing the number of bytes of data that written during an update from a server to a remote device capable of routing telephone calls along a least cost route, the remote device comprising a first memory, a dialer, and a controller, comprising the steps of:

(a) receiving at the server an update request from the remote device;
    (b) providing a data stream at the server comprising data that is to be written to the memory of the device, the data stream comprising a plurality of data bytes, each byte associated with a memory address;
    (c) determining whether two or more of the data bytes are identical and adjacent;
    (d) defining at least one block comprising a set of adjacent data bytes that are identical to each other;
    (e) determining the starting and ending memory addresses for the block;
    (f) counting the number of data bytes in the block and identifying this number as a block count;
    (g) defining a unique pattern command instructing the server to write the data byte at the start address a number of times equivalent to the block count, beginning at the start address on the device;
    (h) repeating steps (c) through (g) until all data bytes in the data stream have been checked to determine if they are adjacent to identical data bytes;
    (i) generating at the server, for all data bytes in the data stream that are not assigned to a block, a customized set of commands relating to the update of the device;
    (j) combining the customized set of commands with all pattern commands generated in step (g) into an update command set; and
    (i) using the update command set to respond to the update request from the remote device.

5. A least cost call routing system comprising a least cost routing device in communication with a server via a network, wherein the least cost routing device has a database for telephone call routing stored in memory, and wherein the least cost routing device determines whether an update of the database is required upon power up and periodically thereafter, and wherein the least cost routing device attempts to connect to the server to initiate an update if an update is required, and wherein the least cost routing device receives a response from the server if the connection is successful, and wherein the least cost routing device stores in memory an updated database provided by the server and comprising least cost call routing information for use in routing telephone calls along a least cost route, the improvement comprising:

means for preventing the least cost routing device from routing calls along a least cost route whenever the least cost routing device determines that the database requires updating.

6. The system of claim 5 comprising means for enabling calls to be placed without attempting to route calls along a least cost route whenever the least cost routing device determines that the database requires updating.

7. The system of claim 5 comprising means for preventing the least cost routing device from attempting to route calls along a least cost route after an unsuccessful attempt to update the database.

8. The system of claim 5 wherein any attempt to place a call aborts a server update attempt in progress at the time of the attempt to place a call.

* * * * *